United States Patent [19]
Sudia et al.

[11] Patent Number: 5,825,880
[45] Date of Patent: Oct. 20, 1998

[54] MULTI-STEP DIGITAL SIGNATURE METHOD AND SYSTEM

[76] Inventors: Frank W. Sudia, 110 E. 84th St. Apt. 4B, New York, N.Y. 10028; Peter C. Freund, 139 E. 79th St., 8th Fl., New York, N.Y. 10021; Stuart T.F. Huang, 2939 Van Ness St., N.W., #907, Washington, D.C. 20008

[21] Appl. No.: 869,253

[22] Filed: Jun. 4, 1997

Related U.S. Application Data

[63] Continuation of Ser. No. 462,430, Jun. 5, 1995, abandoned, which is a continuation-in-part of Ser. No. 272,203, Jul. 8, 1994, abandoned, and Ser. No. 181,859, Jan. 13, 1994, abandoned.

[51] Int. Cl.[6] ................................................. H04L 9/32
[52] U.S. Cl. ............................. 380/21; 380/25; 380/30
[58] Field of Search ............................. 380/21, 33, 25, 380/30

[56] References Cited

U.S. PATENT DOCUMENTS

| | | | |
|---|---|---|---|
| 5,005,200 | 4/1991 | Fischer | 380/30 |
| 5,164,988 | 11/1992 | Matyas et al. | 380/30 X |
| 5,224,163 | 6/1993 | Gasser et al. | 380/30 |
| 5,276,737 | 1/1994 | Micali | 380/30 |
| 5,481,613 | 1/1996 | Ford et al. | 380/30 |

OTHER PUBLICATIONS

Y. Frankel, "A practical protocol for large group oriented networks", Advances in Cryptology, Proc. of Eurocrypt '89 (Lecture Notes in Computer Science 434) (1990), J.–J. Quisquater and J. Vandewalle, Eds. Springer–Verlag pp. 56–61.

Y. Desmedt et al, "Shared generationof authenticators and signatures", Advances in Cryptology, Crypto '91, Proceedings (Lecture Notes in Computer Science 576) (1992), J. Feigenbaum, Ed. Springer–Verlag pp. 457–469.

A. Shamir, "How to share a secret", Commun. ACM 22 (1979) 612–613.

A De Santis et al, "How to share a function securely", undated.

Y. Desmedt, "Threshold Cryptosystems", undated.

R.A. Croft et al, "PUBLIC–KEY CRYPTROGRAPHY AND RE–USABLE SHARED SECRETS", Cryptography and coding, 1986, pp. 189–201.

C. Boyd, "DIGITAL MULTISIGNATURES", Cryptography and coding, 1986, pp. 241–246.

Y. Frankel, "A PRACTICAL PROTOCOL FOR LARGE GROUP ORIENTED NETWORKS", 1989.

B. Blakley et al, "THRESHOLD SCHEMES WITH DISENROLLMENT", 1994.

Yvo G. Desmedt, "Threshold Cryptography", Jul./Aug 1994.

Ham, "Group–oriented (t,n) threshold digitial signature scheme and digital multisignature", IEE Proc. Comput. Digit. Tech. vol. 141, No. 5, Sep. 1994, pp. 307–313.

Colin Boyd, "Some Applications of Multiple Key Ciphers" (undated).

"Threshold Hashing and Signing", Extended Abstract, (undated).

*Primary Examiner*—Gilberto Barrón, Jr.
*Attorney, Agent, or Firm*—Steptoe & Johnson LLP

[57] ABSTRACT

A multi-step signing system and method uses multiple signing devices to affix a single signature which can be verified using a single public verification key. Each signing device possesses a share of the signature key and affixes a partial signature in response to authorization from a plurality of authorizing agents. In a serial embodiment, after a first partial signature has been affixed, a second signing device exponentiates the first partial signature. In a parallel embodiment, each signing device affixes a partial signature, and the plurality of partial signatures are multiplied together to form the final signature. Security of the system is enhanced by distributing capability to affix signatures among a plurality of signing devices and by distributing authority to affix a partial signature among a plurality of authorizing agents.

17 Claims, 15 Drawing Sheets

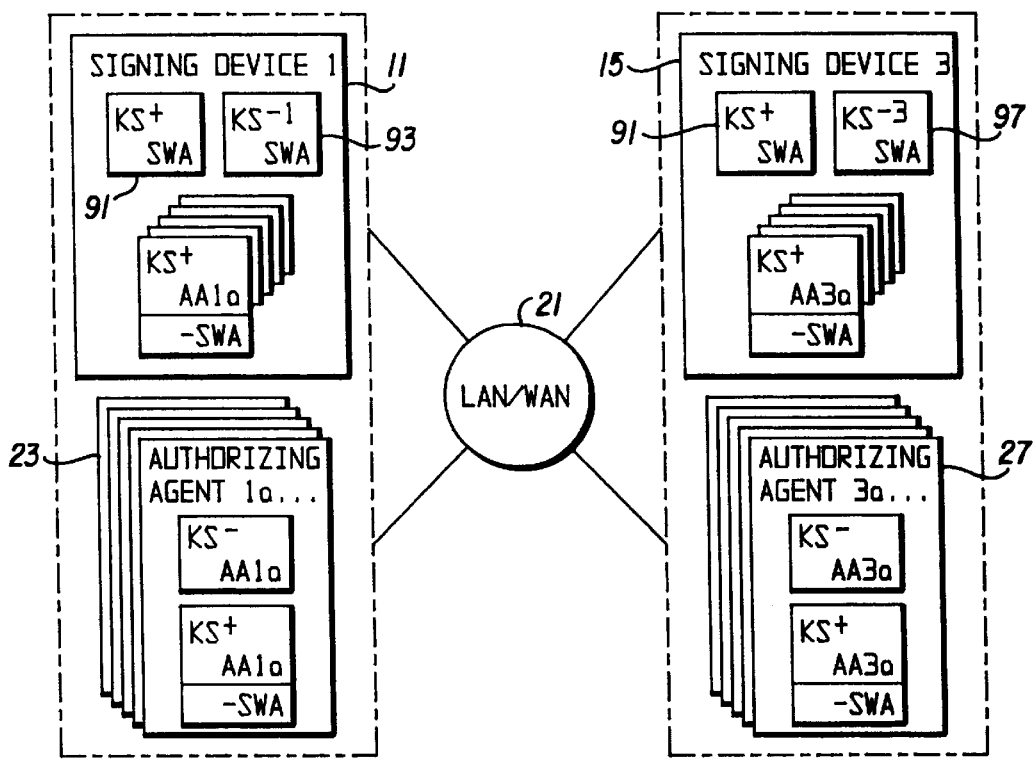

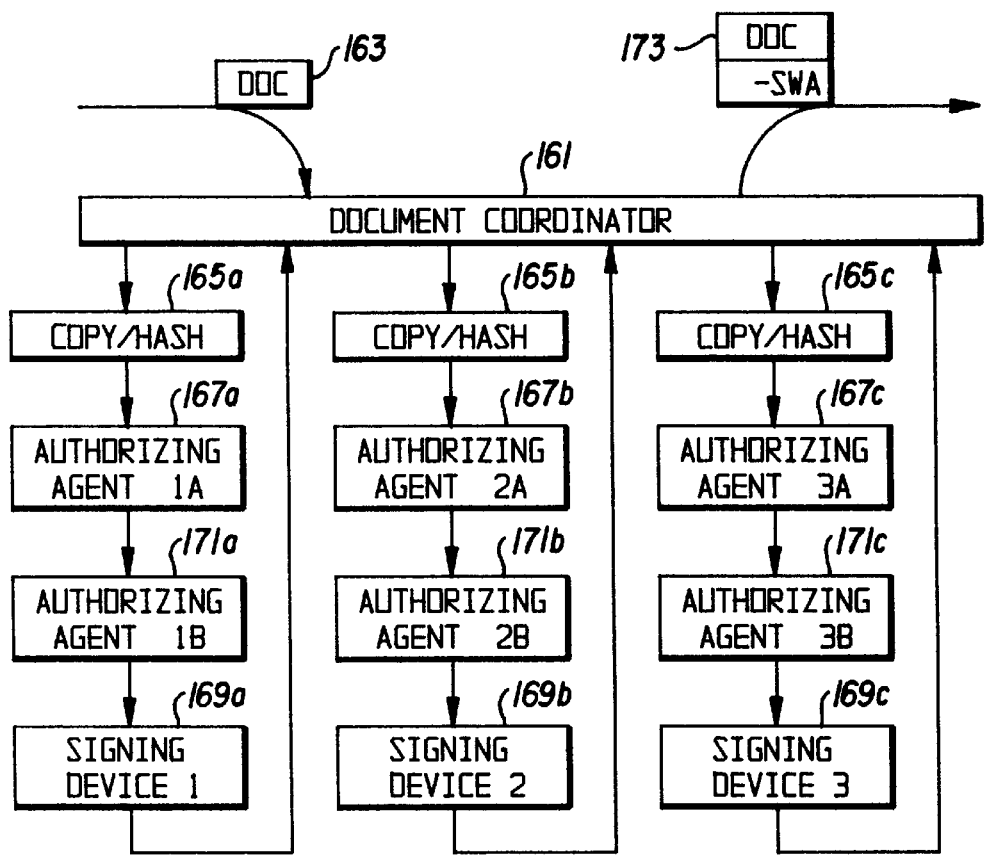
FIG. 11
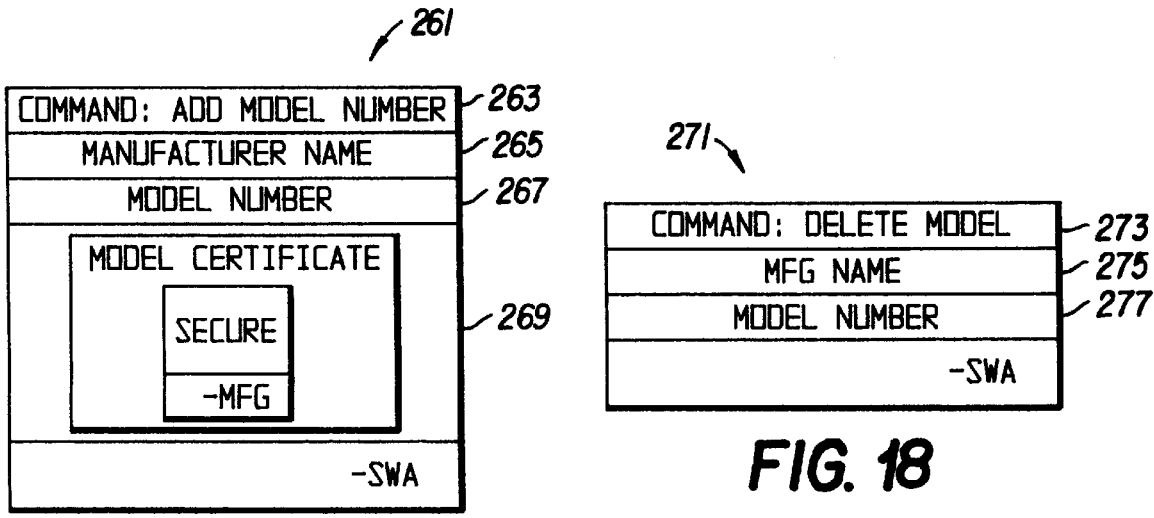
FIG. 17
FIG. 18

MULTI-STEP DIGITAL SIGNATURE METHOD AND SYSTEM

This is a continuation of application Ser. No. 08/462,430, filed on Jun. 5, 1995, now abandoned, which is a continuation in part of U.S. patent application Ser. No. 08/181,859, filed Jan. 13, 1994, CRYPTOGRAPHIC SYSTEM WITH KEY ESCROW FEATURE, now abandoned and U.S. patent application Ser. No. 08/272,203, filed Jul. 8, 1994, ENHANCED CRYPTOGRAPHIC SYSTEM AND METHOD WITH KEY ESCROW FEATURE now abandoned, both of which are incorporated here by reference.

BACKGROUND

Public key certificates are electronic documents signed by a trusted issuer and used to attest to the binding of a user's name to a public key and other related data. Certificates provide assurance to the public that the public key identified in the certificate is owned by the user whose name is in the certificate. Major standards which describe public key certificate systems include ITU-T X509 The Directory—Authentication Framework, and American Bankers Association ANSI X9.30—Part 3: Certificate Management for DSA (draft). Many implementations impose a hierarchical structure in which each trusted issuer, referred to as a Certification Authority (CA) certifies keys for entities that are subordinate to it. The CA affixes a digital signature to the electronic document in a way that is verifiable (one can prove that the CA signed the document) and cannot be forged (one can be assured to a high level of confidence that no one other than the CA signed the document). For example, at the top of the CA hierarchy there may be relatively few "root" CAs, perhaps one per country which certify subordinate CAs. Below the root CAs in the hierarchy, high level CAs (perhaps banks) certify lower level CAs beneath them (e.g., companies), which in turn sign individual user certificates.

A CA's signature becomes more valuable as it creates a large hierarchy of users beneath it and uses its signature key to sign the certificates of both high-value users and subordinate CAs. The CA's signature key then also becomes a more likely target for terrorists, criminals bent on economic gain, and foreign military and espionage services bent on economic spying or de-stabilizing the economy via information warfare. All these issues also apply with equal force to keys used to sign electronic representations of money.

Thus far, the need for security of a CA's private signature key has been addressed by providing a "certificate signing unit" (CSU), which is a tamper-proof secure module satisfying standards set forth in Federal Information Processing Standard (FIPS) PUB 140-1, level 3 or 4 as issued by the U.S. Dept. of Commerce, National Institute of Standards and Technology (NIST). Such a CSU generates its public/private signature key pair internally, "confines" the private signature key securely and permanently inside an area of the device that cannot be read externally, and outputs only the corresponding public key, which will be used to verify its signatures. One CSU available from Bolt, Baranek, and Newman of Boston, Mass. (BBN) is configured to allow a back-up version of its private signature key to be created using a "K-of-N threshold" scheme, in which the private key is split into N shares and placed on small plastic data-keys, each of which contains a memory chip. The data-keys are a patented product of Datakey, Inc. of Burnsville, Minn. Then, should the CSU device be destroyed, a quorum of at least K data-keys can reconstruct the private key.

At least one major security standards body, the American Bankers Association ANSI X9.F1 committee on cryptographic security in wholesale banking applications has recommended that CSU's should be designed to forbid any export of the private key from the device in any form in order to prevent any possible unauthorized theft and use of the key. This approach would require an elaborate procedure for disaster recovery, involving the use of several key pairs simultaneously. Because a single key would exist only in a single CSU at a single site, the loss of a CSU or of a site would force the CA to use another key pair in order to continue business. This would require the CA to publicize and/or securely distribute several (at least two or three) public keys, each identified by a distinct code number (e.g., BT01, BT02, BT03), so that users could continue to verify the signatures that the CA would issue after one CSU (possibly containing the private key for BT01) had been destroyed. See X9.30—Part 3 concerning procedures for disaster recovery.

SUMMARY

An object of the present invention is to provide a digital signing system ("signing system") for certificates and other high value documents (including contracts, electronic representations of currency, negotiable documents, etc.) with improved security and flexibility.

A further object of the present invention is to provide a signing system in which a digital signature verifiably relates to a signature key, and in which no single signing device needs to contain the signature key during the document signing operation.

A further object of the present invention is to provide a signing system which permits loss or compromise of one or more signing devices while maintaining available, un-compromised signing services.

A further object of the present invention is to provide a signing system in which multiple signing devices each create, modify, or combine one or more partial signatures, and the result of operations by multiple signing devices produces a single digital signature.

A further object of the present invention is to provide a signing system in which multiple authorizing agents directly or indirectly authorize each individual signing device to affix or modify a partial signature.

A further object of the present invention is to provide a robust and easy-to-use mechanism in which authorizing agents can temporarily delegate their authorizing capability.

The multi-step signing system described here uses a public key cryptosystem approach to sign an electronic document such that a recipient of the document can verify the signature using a public verification key of the signer. The private signature key which corresponds to the public verification key is not permitted to exist in whole, available form in one place at any time during normal signing operations. Instead, a private signature key consists of "operational shares" which can be used to affix or modify a partial signature, and sequential operation of multiple shares produces a signature that can be verified using the public verification key. The full signature is not completed until all, or some quorum, of the signing devices have signed. Each signing device in turn requires authorization from all, or some quorum, of its associated authorizing agents before participating in the signature process.

If, during the initial generation of operational shares, a whole signature key is generated, the whole signature key is destroyed after shares are distributed. Because the risk of loss from the theft or compromise of any one device is now greatly reduced, the information content of each signing device can be now duplicated (e.g., for remote backup or for a plug-in replacement or "hot" standby) so that if any device fails, it can be replaced (or reconstituted) and service can resume quickly. The consequence of subversion of any individual signing device is lowered, because the signing operation cannot be completed with a single device.

A multi-layered authorization management system is established, such that each signing device has registered within it a number of individuals (or external smart cards used by designated individuals), and the signing device participates in the signing operation only upon authorization from a quorum of registered individuals. A quorum of these individuals (called authorizing agents) are also required to authorize changes to the system, such as registering additional authorizing agents, deleting authorizing agents, altering the quorum requirements for any of the various actions that the signing devices can perform, or generating and distributing additional or substitute key sets.

In this way, a signature can be applied that can be verified using a public verification key, but no private signature key exists at a single location where it may be subject to compromise or catastrophe. Multiple sites must fail or be compromised before interrupting signing services or before an adversary acquires sufficient information to forge signatures. Individual signing devices need not be as be as highly secure for a CSU using a single whole key. A relatively inexpensive device meeting the standards of FIPS 140-1 level 3 may be used (i.e., a device that is tamper resistant), thus avoiding the need to use a relatively expensive level 4 device (which takes active measures to destroy or safeguard internal information when tampering is detected).

An authorization delegation mechanism allows an authorizing agent to let a delegate, or quorum of delegates, authorize his smart card to affix his/her signature during temporary periods of time.

BRIEF DESCRIPTION OF THE DRAWINGS

The invention will be described below with reference to attached drawings in which:

FIG. 7 shows an overall system architecture for certifying and registering authorizing agents;

FIG. 11 illustrates the flow of a document during a parallel embodiment of the Multi-Step Signing System.

FIG. 15 illustrates a sample request with a command to add a manufacturer.

FIG. 16 illustrates a sample request with a command to delete a manufacturer.

FIG. 17 illustrates a sample request with a command to add a model number.

FIG. 18 illustrates a sample request with a command to delete a model.

DETAILED DESCRIPTION OF THE PREFERRED EMBODIMENTS

Figure 1:
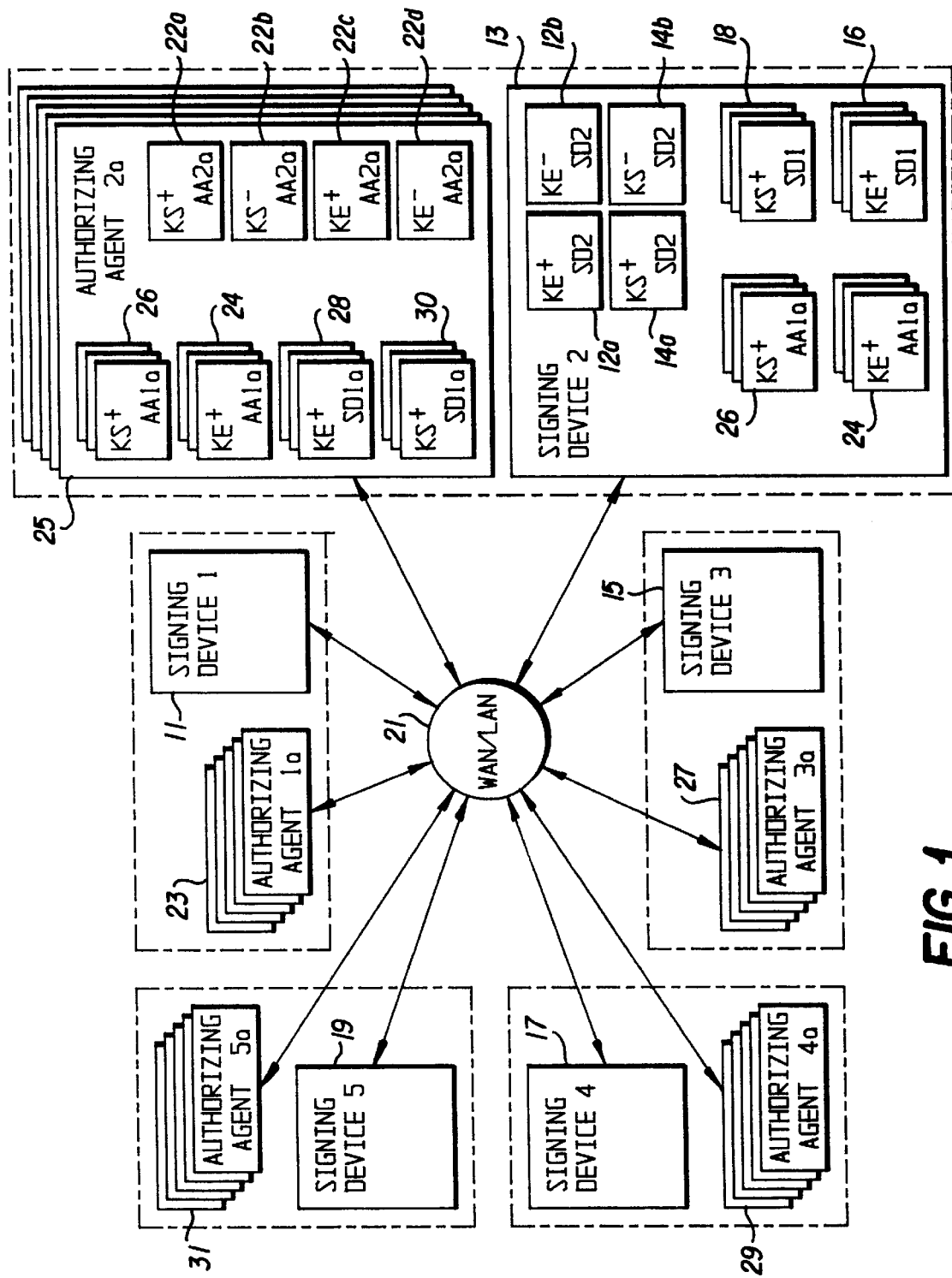
FIG. 1 illustrates an overview of a basic architecture for an operational signing system in accordance with the present invention.

The most direct explanation of the multi-step signature method begins with a discussion of several relevant mathematical processes.

A. Multiplicative Scheme with Sequential Partial Signing

First, a secret signature key "$K_{SWA}$" of a public/private key pair belonging to a "system-wide authority" is represented as number ("n0") of shares ("$a_i$") in such a way that the signature key $K_{SWA}$ can be computed as the product of any threshold number ("t0") of shares, where t0 is less-than-or-equal-to n0. The representation is done such that it is difficult or impossible to recover the signature key $K_{SWA}$ when possessing fewer than t0 shares. This can be accomplished by, for example: 1) using a Shamir-type secret sharing scheme (A. Shamir, "How to Share a Secret," Communications of the ACM, November 1979, V. 22, n. 11), 2) using a Blakley-type secret sharing scheme (G. R. Blakley, "Safeguarding Cryptographic Keys," Proceedings of the National Computer Conference, 1979, American Federation of Information Processing Societies, V. 48, 1979, pp. 242–268); 3) factoring the key; or 4) generating the key as a product of known factors. All that is necessary is that the private key is represented as:

$$K_{SWA} = a_1 * a_2 * \ldots * a_{t0} \pmod{2N}$$

where $K_{SWA}$ is the signature key and $a_i$ are any combination of t0 shares.

Second, a signature is formed using multiple devices by having each device exponentiate a partial signature left by a prior device, using one share ai of the private key. When using "modulo N" arithmetic (wherein an arithmetic operation concludes by dividing the result by a modulus N and taking the remainder as the modulo N result), the following relationship between multiplication of exponents and sequential exponentiation is true:

$$(x^{a1*a2})(\mathrm{mod}\ N) = ((x^{a1})^{a2})(\mathrm{mod}\ N) = ((x^{a2})^{a1})(\mathrm{mod}\ N)$$

Stated another way, if a base value x is exponentiated by the product of two factors a1 and a2, the result is the same as if the base were exponentiated by a first factor a1, and that result exponentiated by the second factor a2. Furthermore, the order of exponentiation may be reversed, so that the result will be the same if the base is first exponentiated by the second factor a2, and that result exponentiated by the first factor a1. This relationship can be generalized to exponentiation by three or more factors. Unless stated otherwise, all arithmetic operations are to be considered modulo N.

In the multi-step signature method, shares of a signature key $a_1, a_2, \ldots, a_{n0}$ are distributed to separate devices. A first device affixes a partial signature to a document by hashing the document (the symbol "H" will be used to designate the result of the hash operation) and exponentiating the hash as:

first partial signature=$(H)^{a1}(\mathrm{mod}\ N)$

A second device advances the signature by exponentiating the first partial signature using a second share $a_2$ as:

second partial signature=$((H)^{a1})^{a2}(\mathrm{mod}\ N)$

The process repeats until "t0" devices have exponentiated the hash using each of "t0" separate shares, to produce a final signature that can be verified using the public $K^-_{SWA}$.

B. Additive Scheme with Asynchronous Partial Signing

An alternative way to accomplish a similar result involves dividing the private key of the signing authority into shares which can be added (modulo N) to yield the private key.

$$K = a_1 + a_2 + \ldots a_t (\mathrm{mod}\ N)$$

This in turn permits the multi-step signing to be performed in an asynchronous manner by separately generating intermediate values $(H)^{ai}$ by exponentiating the hash by each of the shares, and then multiplying the resulting intermediate values, such as the following:

$$S = H^{a1} * H^{a2} * \ldots H^{a3}(\mathrm{mod}\ N)$$

This can have considerable operational advantages over the sequential method described above, because it is not necessary to route the message sequentially from one location to another. Instead, a central administrator can, in a straightforward manner, simply send the same message (or hash) directly to each location for partial signing, and then combine the resulting partial signatures to produce the final desired official signature. This final combining operation does not require any special security, because it does not add any information not already contained in the partial signatures, thus allowing the administrator to work from a desktop. Indeed, the partial signatures could conceivably be left for later combining by the recipient who verifies the transaction! This burdens the recipient with additional processing workload, but does not weaken the security of the official signature.

Signature schemes based on exponentiation which can be modified to permit multi-step signing include: R. Rivest, A. Shamir and L. Adleman ("RSA"), "A method for Obtaining Digital Signatures an Public Key Cryptosystems," Communications of the ACM, v.21, n.2, pp.120–126, February 1978); D. Kravitz, Digital Signature Algorithm ("DSA"), U.S. Pat. No. 5,231,668; Desmet, Y. Frankel, "Threshold Cryptosystems," CRYPTO '89, pp.307–15, 1989; Taher El-Gamal , "A Public Key Cryptosystem and a Signature Scheme Based on Discrete Logarithms" ("*El-Gamal Signature Algorithm*"), IEEE Transactions on Information Theory, Vol. IT-31, No. 4, July 1985; S. Micali, "A Secure and Efficient Digital Signature System," MIT/LCS/TM-501, Massachusetts Institute of Technology, Laboratory for Computer Science, March 1994; A. Menezes et al., "Elliptic Curve Public Key Crypto Systems," 1993.

SYSTEM OVERVIEW

FIG. 1 illustrates an overview of an architecture for a signing system in accordance with the present invention. The architecture includes multiple signing devices 11, 13, 15, 17, 19 interconnected by a wide area network (WAN) or local area network (LAN) 21. Individual signing devices 11, 13, 15, 17, 19 are dispersed geographically as widely as the WAN/LAN permits, such as in separate continents, separate cites or at least in separate parts of a single metropolitan area.

In FIG. 1, Signing Device 2 has been illustrated in greater detail as an example. Each signing device is assigned a permanent identification code (e.g., unique serial number) and a logical name (e.g., "Signing Device X"), along with a public/private device key pair 12a, 12b, for encrypting/decrypting communications and a separate public/private device key pair 14a, 14b, for verifying/signing signatures. In addition, each signing device receives the public encryption keys 16 and public verification keys 18 for all other signing devices.

Hereafter, encryption/decryption keys are designated as "KE," while "KS" designates signature/verification keys. A plus ("+") superscript indicates a public key, and a minus ("−") superscript indicates a private key. Subscripts indicate the owners of the private keys of respective key pairs.

Groups of authorizing agents 23, 25, 27, 29, 31 are also interconnected through the network to one another and to the signing devices 11, 13, 15, 17, 19. Each authorizing agent is a person acting through a trusted computer device (such as a tamper-resistant smart card, or other trusted device) as will be discussed more fully below. Authorizing agents may be dispersed to the full extent of the LAN/WAN 21, but it is assumed that groups of authorizing agents will be located in proximity to corresponding signing devices at most times for the convenience of the organization managing the signing system.

In FIG. 1, Authorizing Agent 2a (item 25) has been illustrated by way of example and using the same notation for keys as discussed above in relation to keys held by Signing Device 2. Each authorizing agent's trusted device is assigned a unique name, along with a public/private device key pair 20a, 20b for encrypting/decrypting communications and a separate public/private device key pair 22a, 22b for verifying/signing signatures. If the RSA public key cryptosystem is employed, then one such pair could be used for both signatures and encryption at the same time. Authorizing agents also receive public encryption keys 24 and public verification keys 26 of all other authorizing agents.

Signing devices also receive the public encryption keys 24 and public verification keys 26 for all authorizing agents. Similarly, Authorizing agents' trusted devices receive public encryption keys 28 and public verification keys 30 for all signing devices.

For ease of explanation of the multi-step signature process which follows, it will be assumed that all communications on the network are encrypted using a standard Public Key Cryptosystem ("PKC") scheme, such as RSA-key-transport. It will also be assumed that commands sent from one network entity to another are signed by the sender using a standard (PKC) scheme, such as RSA-signature with MD5 message digest. In future drawings, device encryption/ decryption keys, and device signature/verification keys may be omitted, but should be understood as present in all devices as discussed above.

Figure 2:
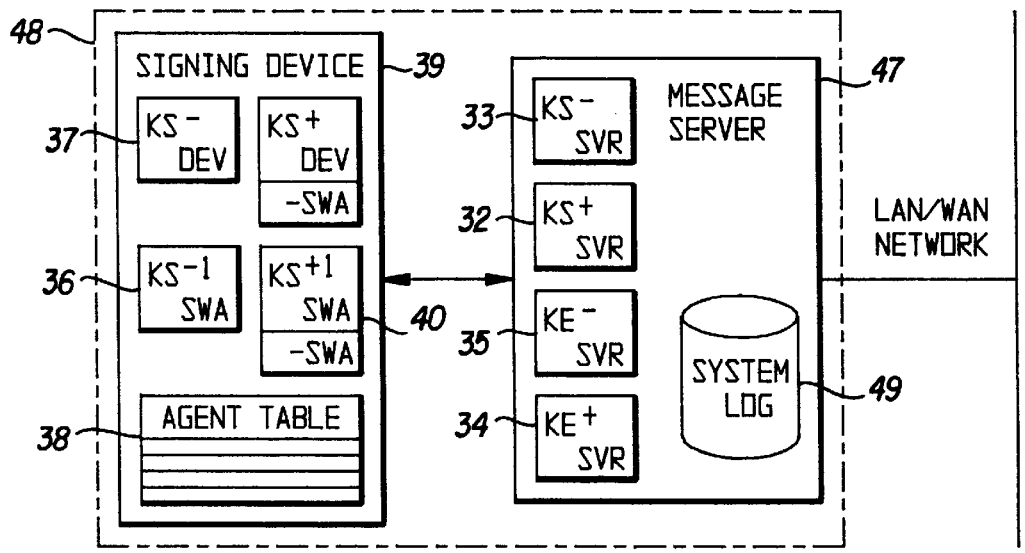
FIG. 2 shows a preferred architecture for a data center having a signing device.

FIG. 2 shows a preferred architecture for a secure data center computer configuration 48, where each signing device of FIG. 1 preferably will be found. In addition to a signing device 39, each data center configuration 48 additionally contains a separate message server 47. The signing device 39 is dedicated to signing operations and is located in a physically secure location, such as a vault. There is no direct connection between the signing device and the external computer network. As will be discussed more fully below, the signing device 39 will be provided with a key share for multi-step signing 36, its own device signature key 37, table 38 identifying its authorizing agents, and a certificate for its public verification key 40, a public key chosen to match its key share 36 (where the certificate is signed by the full $KS_{swa}$ via the multi-step method).

During the multi-step signing processes, a signing device 39 will receive requests through the message server 47. The message server performs routine communication processes, such as stripping off routine privacy envelopes which may have been affixed by intermediates (the server 47 does not possess the signing device's private decryption key), and queuing the inputs in case they are presented faster than they can be processed. The message server presents messages to the signing device for signing, receives the signed (or partially signed) result, and either (a) returns the partially signed result to the requester, or (b) routes the result to the next device in the protocol. In order to receive and participate in ordinary communication protocols, the message server also possesses a public-private key pair 32, 33 for signing its own messages, and another 34, 35 for encryption, to enable it to receive and open encrypted messages—thereby freeing the signing device of this routine burden without significantly affecting the security of the secure signing process.

The message server 47 may be a comparatively less secure computer in a lower security environment such as an ordinary secure data center. The message server 47 connects to the LAN/WAN 21 and provides document queuing and communications services for the signing device 39. The message server 47 includes a system log 49 that maintains an audit trail of messages and documents sent to and from the signing device. As shown, a signing device and its associated message server preferably are divided into two, physically separate computers. Although less preferred, the signing device 39 and message server 47 could be implemented as separate tasks on a single computer in a highly secure environment.

The message server can also provide a layer of protection, known as a "firewall," that separately validates all transactional inputs prior to passing them on to the signing devices. Otherwise an "on-line" signing device accessible to a public network would be open to unlimited hacking attempts, as well as to network saturation attacks aimed at denial of service. Denial attacks may disrupt daily certificate issuance, but would not cripple users who rely on previously signed documents (which is the vast majority of the anticipated user population). However, hack attempts will always pose a threat, especially if hackers identify some hidden flaw. The message server can verify all messages against a list of authorized devices (signing devices and authorizing agents), as well as more complex strategies to identify possible attacks, deny access after a number of failed attempts, and undertake sophisticated actions to track down the source of any false data inputs. This will allow the signing device's firmware to remain simpler and easier to validate, while also allowing the system operators to modify their detection and evasion strategies in accord with the current state of network security.

Figure 3:
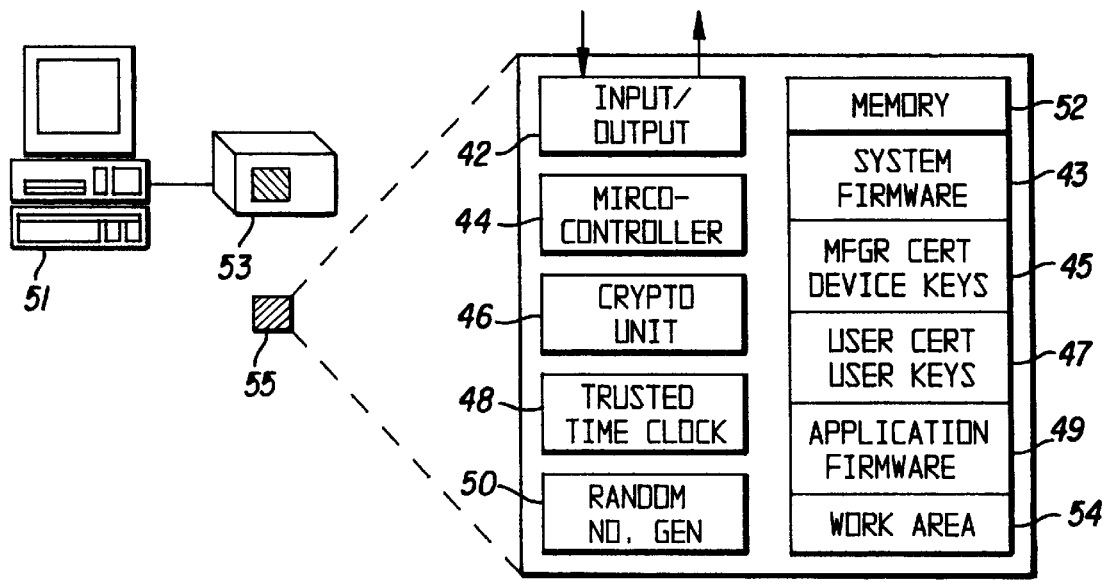
FIG. 3 illustrates a preferred architecture for a trusted device used by an authorizing agent.

FIG. 3 illustrates a working station for authorizing agents. The human operators who act as authorizing agents may work in relatively unsecured areas at desk-top computers or terminals 51 typically found in a business office. Each such computer or terminal will have a card reader 53, and each operator will have a secure "smart card" 55. Each smart card 55 securely contains a private decryption key and a private signature key which are unique to that smart card. The human operator can use the card to issue signing instructions. Such a trusted device may be implemented using a FIPS level-3 device, such as an iPower card from National Semiconductor Corp. of Santa Clara, Calif., which can be readily reprogrammed at the firmware level to allow for progressive evolution of new methods and procedures for secure signing and authorization without needing to replace the physical devices. Each authorizing agent's trusted device must have at least a private signature key. Preferably, the private signature key is installed in the device at time of manufacturer, and the corresponding public verification key is "certified" by the manufacturer. Certification here means that the manufacturer has included, with the trusted device, an electronic message containing the device's serial number and public key, along with its model number and other evidence of its trusted characteristics, and that message (certificate) has been signed by the manufacturer.

The human operators use their desk-top computers to read and generate messages. When a human operator wishes to sign a message, the desk-top computer sends the message to the trusted device, which appends a digital signature using the device private signature key. In the preferred embodiment, this signature is the signature of a second signature key pair which has been specifically generated for and certified as belonging to the specified user. In this manner, the system can continue to use the device's signature to verify the trust level of the device on any given transaction, while using the user's signature to attest to the user's identity and consent to the transaction. This allows the user key to be generated and revoked remotely, depending possibly on various administrative facts about the user's identity or authority, while also allowing the device to be reused, or to host several other user key pairs which the user may wish to use for other unrelated purposes.

FIG. 3 also illustrates a preferred architecture for a possible trusted device to be used by an authorizing agent. It comprises a single micro-chip encased on a card in a configuration known as a "smart card." The micro-chip device has input/output circuitry 42 for power and communications, and a microcontroller 44 for executing firmware programs. Memory 52 contains system firmware 43 to operate the hardware of the microchip (similar to a simple operating system). Memory 52 also includes areas for storing manufacturer-installed device keys 45, user keys 47 received as part of the protocol described herein, and application firmware 49 for executing the network protocols described herein. Additional unused memory is provided as a work area 54 for temporary storage as required. The micro-chip may also include an optional "crypto-unit" 46, which is a special purpose arithmetic accelerator unit having hardware for performing accelerated exponentiation and other arithmetic operations of encryption/decryption and signature processes. The micro-chip further includes an optional trusted time-clock 48 (assuming the presence of suitable battery power) initialized by the manufacture and useful for time stamping signatures. The micro-chip further includes an optional random number generator 50 to be used with encryption/decryption processes. The smart card may also include an optional noise source (not shown), such as a diode, that is either internal or external to the micro-chip, for use in generating random numbers.

The signing device previously shown in FIG. 2 may also be a smart card having the same general design as the trusted devices of the authorizing agents.

Devices in the network will be initialized in a series of stages as follows:

1) encryption key distribution;

2) signing device temporary certification;

3) authorizing agent temporary certification;

4) key share distribution;

5) signing device re-certification; and 6) authorizing agent certification.

Each will be discussed in turn. Following the discussion of system initialization, the preferred methods of use for signing highly secure certificates and other documents will be explained, as well as further variations and enhancements.

ENCRYPTION KEY DISTRIBUTION

Each signing device, and each authorizing agents' smart card is assumed to be a "trusted device" in that it is a tamper-resistant device that functions only in accord with stated characteristics, and whose manufacturer has endowed it with a device signature key pair and a device encryption key pair stored in a protected memory. At a minimum, the manufacturer of such a device will attest that the device will not divulge either its own or its user's private key(s) without an expensive tampering effort. Each device also has an electronic certificate, signed by the manufacturer, containing: 1) the device serial number; 2) the device's public signature verification key; and 3) the device's public encryption key. The manufacture may install two separate certificates, one for the signature verification key and one for the encryption key. Signing devices encrypt their communications using a public/private cryptographic scheme. In the alternative, the method can proceed without manufacturer certificates by providing physical protection for all devices, such as conducting the initialization tasks in a secure vault where a small (notebook) computer is used in lieu of a trusted signing device.

It is assumed that each trusted device begins with certain basic functionality, such as software conferring the ability to initiate and receive messages through a network or an electronic mail system, that lets it communicate with other trusted devices. It is also assumed that at least one signing device, designated as the "lead" device, is capable of receiving information about the initial state of the system from human operators responsible for initializing the system.

The next step in preparing the system is for devices to exchange device keys. Key distribution proceeds as follows.

1) One signing device, designated as the "lead," receives from human operators the identities of other signing devices in the system. The lead device sends its public encryption key and public signature verification key to the other signing devices. Optionally, the lead device may also send a message for validating the firmware under which it is operating, for example, by hashing its firmware, signing the hash value using its device signature key and sending the signed hash value to the other devices.

2) After other signing devices receive the lead device's public encryption key, each other signing device sends its respective public signature verification key and public encryption key certificate(s) back to the lead device. If the lead device sent a hash of its firmware, each other signing device hashes its own firmware and compares the two. Both hashes must match, otherwise, the respective signing device stops participating in the protocol and notifies its operators. This comparison of hash values ensures that all signing devices use identical firmware, which acts as a check that the lead device is not an "impostor." Each signing device optionally returns a hash of its respective firmware to the lead device.

3) The lead device compares the hashes of the respective other devices' firmware against its own hash, which acts as a check that none of the other devices is an impostor.

All signing devices now have received public encryption and signature verification keys for the other devices. It will be understood that all future messages will be signed by the sender's private signature key and verified by the recipient using the sender's public verification key. It will also be understood that all communications will be encrypted using the recipient's public encryption key and decrypted using the recipient's private decryption key.

These additional signature keys are not used for multi-step signing (which will be discussed below), but are used instead for encrypting and signing routine communications among network entities as proof of a device's individual identity. Such proofs of identity and membership in the group are of critical importance when generating and distributing the master key fragments for use in the actual multi-step protocol.

SIGNING DEVICE TEMPORARY CERTIFICATION

Figure 4:
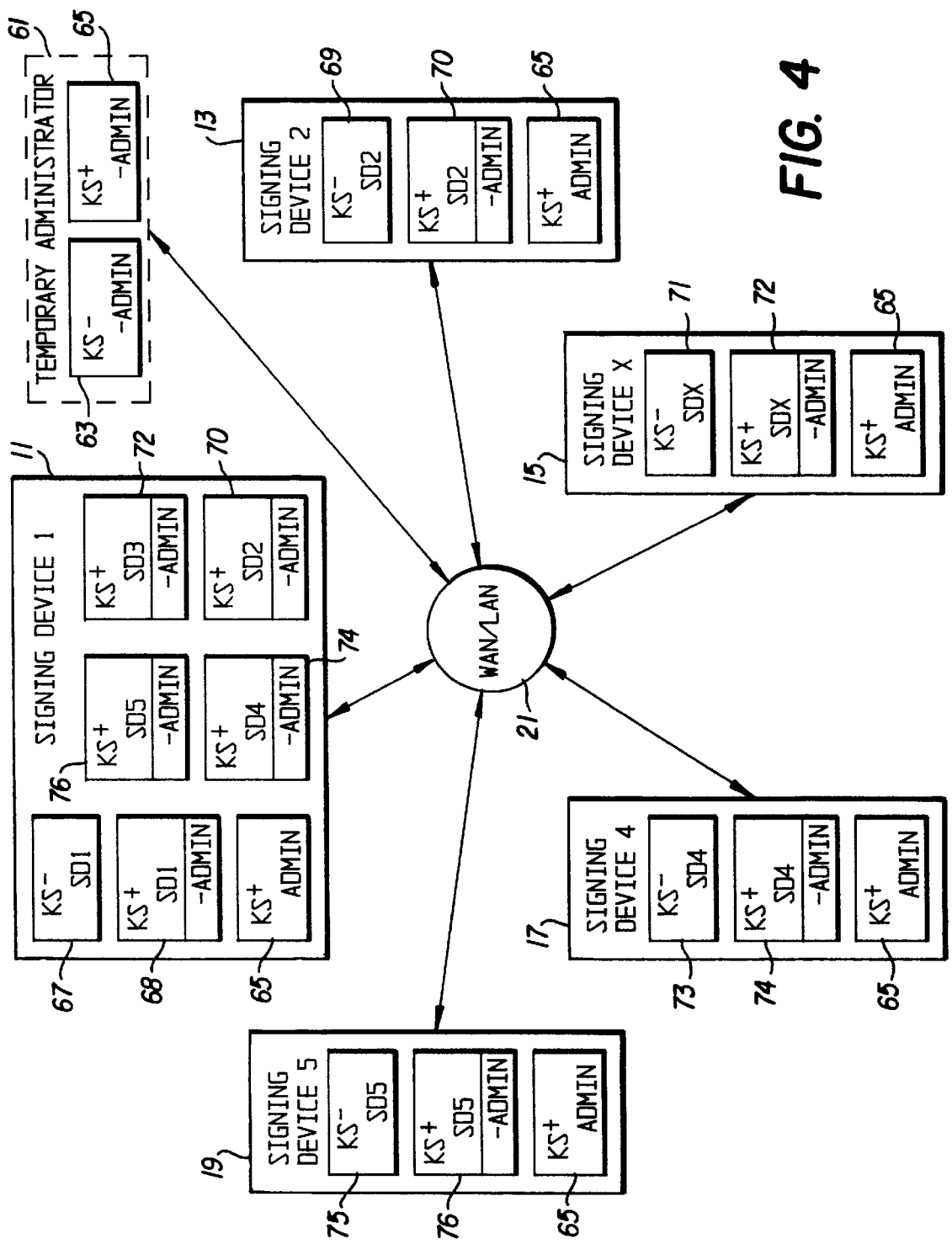
FIG. 4 illustrates a process for temporarily certifying uninitiated signing devices, during system startup and initialization.

FIG. 4 illustrates temporary certification of uninitiated signing devices. During this process, signing device's public key certificates (which were unsigned or signed by the device manufacturer) will be replaced by certificates signed by a temporary administrator ("the administrator") 61. The administrator preferably is a human operator responsible for initializing the system and acting through the administrator's personal smart card. This temporary certification establishes an increased level of security among signing devices (as belonging to the target group) for use while they generate signature keys for multi-step signing. During actual use, it is anticipated that the temporary administrator would be operating with multiple human witnesses to assure correct procedures, and that the temporary certification would be effective only for the minimal time (a few minutes or hours, at most) necessary to perform the complete master key generation protocol. Temporary certification proceeds as follows:

1) The administrator 61 generates a private signature key 63 and a corresponding public verification key 65.

2) The administrator 61 communicates its public signature verification key 65 to each of the signing devices 11, 13, 15, 17, 19.

3) Each signing device 11, 13, 15, 17, 19 generates a private signature key 67, 69, 71, 73, 75 and a public verification key (not shown), and sends a signature key certification request to the administrator 61. The signature key certification request is an electronic message containing the name of the signing device (e.g., a device serial number and/or a logical name, such as "SD1"), the device's newly generated public signature verification key, and other administrative information as desirable.

4) The administrator signs each certification request using the administrator's private signature key.

5) The administrator returns the signed signature key certificates 68, 70, 72, 74, 76 to the respective signing devices 11, 13, 15, 17, 19. Signed certificates 68, 70, 72, 74, 76 are illustrated as symbols for public signature keys (KS+) with appropriate subscripts and, attached below, the administrator's signature ("--ADMIN"). Such certificates will, of course, also include information on device identity and type (not shown).

6) The signing devices exchange their new temporary public signature verification key certificates among one another.

Each signing device now possesses: a) the administrator's public verification key; b) its own temporary private signature key; 3) its own temporary certificate, signed by the administrator and bearing the signing device's temporary public signature verification key; and 4) the temporary signature verification key certificates of the other signing devices. Each signing device can use the administrator's verification key to verify the administrator's signature on the temporary certificates received from the other signing devices.

Each signing device may now advance to a more tightly controlled phase of the protocol by exchanging messages using the signature keys that have been certified by the temporary administrator. For ease of explanation, it will be assumed that communications on the network involved in the multi-signature operations from this point until the end of device recertification are signed using a signature key that has been certified by the temporary administrator, and that each recipient verifies the sender's signature of the sender. If a message is not properly signed, the message will be rejected and the protocol will fail to continue unless a conforming message is supplied. It is further contemplated that some form of threat analysis or threat response may be undertaken when an improperly signed or unsigned message is received during the multi-step initialization and signature operations.

AUTHORIZING AGENT TEMPORARY CERTIFICATION

FIG. 4 illustrates temporary certification of authorizing agents. As will be discussed more fully below, a signing device affixes a partial signature only in response to authorization from a quorum of authorizing agents. Signing devices operating under the authorization of the temporary administrator also require a quorum of authorizing agents. Temporary certification of authorizing agents assure that only designated human agents may authorize signing devices during the initiation process.

The procedure for temporarily certifying authorizing agents is similar to the procedure above for temporarily certifying signing devices, and proceeds as follows:

1) The temporary administrator 61 communicates its public signature verification key 65 to each of the authorizing agents 23, 25, 27, 29, 31.

2) Each authorizing agent generates a private signature key certification request to the temporary administrator 61. The signature key certification request contains at least the following information: a) authorizing agent name (human's distinguished name); b) identification code for the agent's trusted device (e.g., smart card serial number and model number); c) signature verification key for the human agent; and d) signature verification key for the agent's trusted device (which serves as an assurance that the trusted device is of a known type).

3) The administrator signs each certification request using the administrator's private signature key.

4) The administrator returns the signed signature key certificates to the respective authorizing agents.

KEY SHARE DISTRIBUTION

Figure 5:
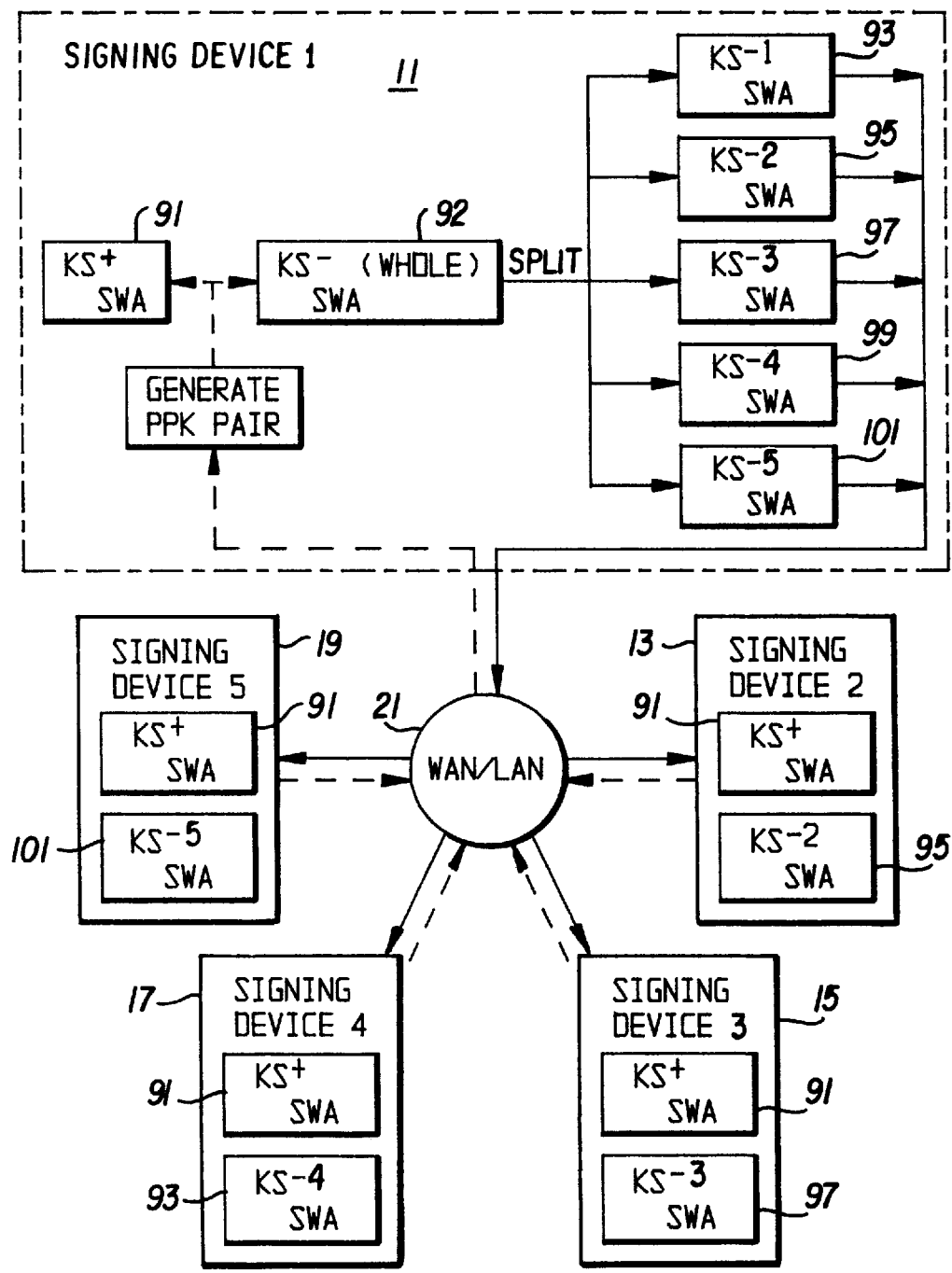
FIG. 5 illustrates a process for generating and distributing operational shares of a system wide authority key.

FIG. 5 illustrates generation and distribution of "operational shares" of a system wide authority (SWA) "official" signature key. One signing device, here Signing Device 1 (item 11), is designated as a "lead" device. Human operators provide to this lead signing device at least the following information:

a) The threshold parameters for splitting a key into shares, i.e., the total number of shares to be generated and the minimum number needed to affix the SWA signature.

b) A key identification number and/or logical name to be assigned to the public/private key pair, e.g., key serial number "KS-01234," or logical name "BT01." c) Key share identification numbers and/or logical names to be assigned to the respective shares, e.g., "SWA-SHR-56789," or "BT01a."

d) The device certificates of authorizing agents who will initially be permitted to authorize that particular signature for each device.

The human operators may additionally provide a number that limits the total number of fragments that can reside in a single signing device, which can be used when a signing device has multiple master keys as discussed more fully below.

The next step is to generate shares for a signature key, called the "system wide authority" (SWA) key, which will be used to administer the system. The public SWA public signature key and corresponding private SWA key shares are generated and distributed as follows.

1) Each signing device 11, 13, 15, 17, 19 transmits an encrypted string of random "seed" information to the lead signing device 11.

2) The lead device 11 combines the seed information and uses it to generate a public system wide authority signature verification key ($KS_{SWA}+$) 91, which ultimately will be used to verify official signatures.

3) The lead device 11 generates operational shares 93, 95, 97, 99, 101 of a private SWA signature key. This may be accomplished by first generating a whole private/public key pair using well known prior art key generation methods and then splitting the private signature key 92 into shares using one of several well known private signature key splitting methods. The generation of shares carries with it a requirement that a minimum number of separate shares n0 be sufficient to complete a system wide authority signature.

4) The lead device 11 transmits the SWA public verification key 91 and one private signature key share 95, 97, 99,

101 to each other signing device, while retaining a copy of the SWA public verification key 91 and one share of the SWA private signature key 93 for itself. Each SWA private signature key share is transmitted with the following additional information:

a) a type code identifying the key as a signature key share (also indicating the length of the share);

b) a unique identification code for the SWA public verification key;

c) a unique identification code for each respective SWA private signature key share;

d) the total number of SWA private signature key shares distributed;

e) the minimum number of SWA private signature key shares needed to complete a SWA signature;

f) the identities of signing devices receiving other SWA private signature key shares; and g) certificates of authorizing agents who will be permitted initially to authorize use of each SWA private signature key share on the target signing device.

The lead device 11 will encrypt each SWA private signature key share using the certified public encryption key of the respective signing device for which it is intended.

5) The lead device 11 outputs the public SWA verification key for the human operators and erases the following information:

a) the whole private SWA signature key (if at any time during the generation process the whole private SWA signature key was stored); and b) all shares of the SWA private signature key (except for one share which it retains for its own use).

6) Each recipient signing device installs its SWA private signature key share in a tamper-proof memory area, along with the certificates of the initial human authorizers for that device.

It is preferred that the private SWA signature key exist at most only in the lead signing device 11, and then only for the minimum time necessary to generate and distribute shares. In this way, the whole private SWA signature key simply does not exist for operational use, and is susceptible to attack for only a short period of time during the generation process.

At this stage, each signing device now additionally has securely received: a) a copy of the public SWA signature verification key; and b) a private SWA signature key share.

For the purpose of illustrating an example in the following discussion, it will be assumed (for the sake of simplicity) that the minimum number of shares n0 needed to affix the SWA signature is two out of five shares. It should be understood that a higher number may be chosen, most probably at least three, which will increase security, but which will also increase the number of steps in the signing process.

SIGNING DEVICE RECERTIFICATION

During previous steps of the initialization protocol, a temporary administrator 61 certified device signature verification keys under the authority of the temporary administrator 61, and the signing device certificates were signed by the administrator's temporary signature key. During recertification, each signing device will circulate a new certificate request for its own public key among the other signing devices to be certified under the system wide authority key using multi-step signing.

Figure 6:
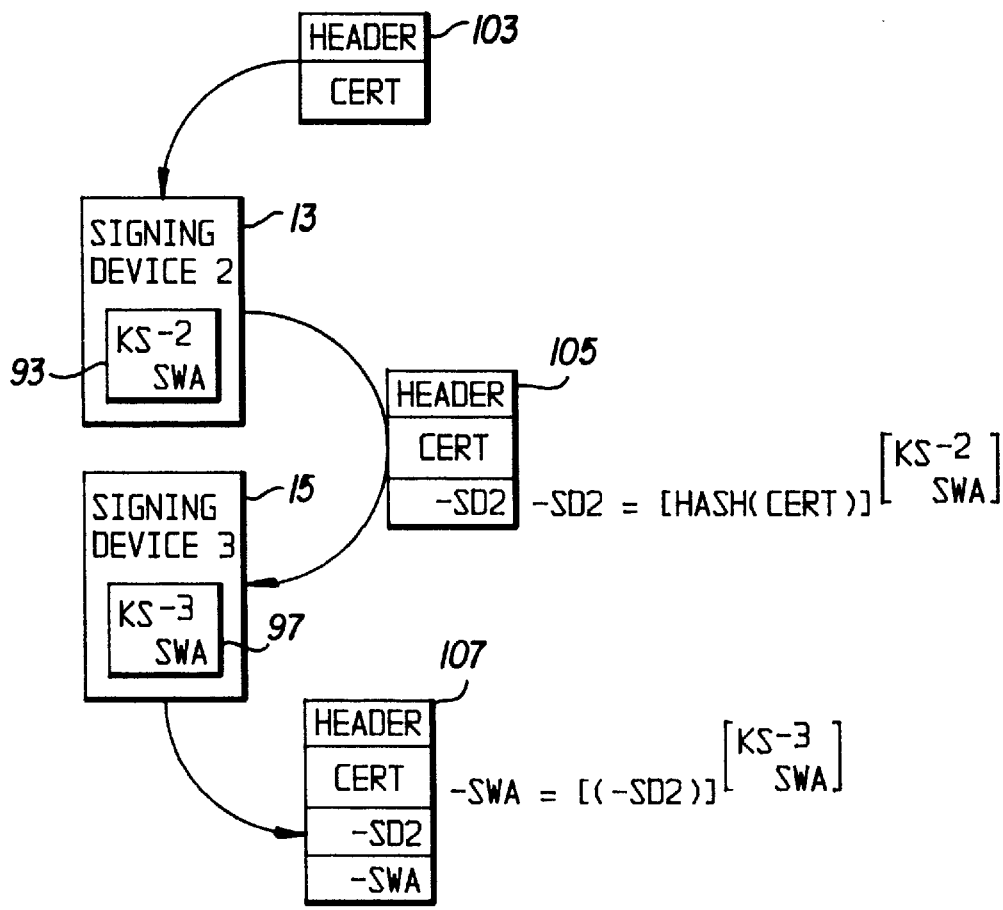
FIG. 6 illustrates a multi-step signature procedure for recertifying a signing device.

FIG. 6 illustrates steps for recertifying Signing Device 1. The other signing devices will recertify themselves by repeating the process for each device. The process for Signing Device 1 proceeds as follows:

1) Signing Device 1 generates an unsigned certificate 103 and transmits that certificate to Signing Device 2. The certificate includes at least: a) the signing device's identity (e.g., serial number and/or device logical name); and b) a public signature verification key for the device's signature key. The key which is to be recertified is the same public key which was originally generated by the device at the start of the protocol, and first temporarily certified by the administrator. This key will now become the device's permanent indicia of membership in the family of signing devices handling the shares of this particular SWA key. (The device signing key and its associated manufacturer's certificate remain unchanged during this process, and are retained permanently as proof of the device's origin and underlying characteristics.)

2) Signing Device 2 affixes a partial SWA signature using its SWA signature key share 93. The partial signature is formed in two steps. First, Signing Device 2 applies a "hash" function (such as MD5 or SHA) that generates a reduced-length string that is verifiably related to the un-hashed certificate. This string is expressed as binary digits which can be manipulated as a numerical (large integer) value. Second, Signing Device 2 forms a partial signature by exponentiating the hash string with its SWA signature key share. That is, Signing Device 2 calculates a numerical value, which becomes the partial signature, according to the formula:

$$-\text{SD2} = (\text{HASH}(\text{CERT}))^{[KEY\ SHARE\ 2]} \text{modulo}\ N$$

(Note that in both text and drawings, a string of bits that constitutes a signature block is typically indicated by placing a long dash in front of the signer's identifying label. The resulting block is typically appended to the bottom of the block of data that was signed, or is otherwise obvious from the context.)

3) Signing Device 2 sends the partially signed certificate 105 to Signing Device 3.

4) Signing Device 3 completes the system wide authority signature by exponentiating the already-applied partial signature --SD2. That is, Signing Device 3 calculates a numerical value according to the formula:

$$\begin{aligned}
--SD3 &= [--SD2]^{[KEY\ SHARE\ 3]}\ \text{modulo}\ N \\
&= ((\text{HASH}(\text{CERT})\ \text{exp}\ KEY\ SHARE\ 2)\ \text{exp}\ KEY\ SHARE\ 3) \\
&= --SWA
\end{aligned}$$

The partial signature affixed by Signing Device 2 may be allowed to remain attached to the document as an audit trail. Note that only 2 partial signatures were required in this simplified example.

5) Signing Device 3 returns the signed certificate 107 to Signing Device 1, which then distributes copies of the certificate to the other signing devices, thereby allowing them to verify its future signatures.

In this example, signing devices 2 and 3 affixed signatures in that order. Any combination of signing devices may sign in any order (as long as the number exceeds the minimum t0), producing the same signature.

Recertification is important, because future operations performed by the full system of signing devices will preferably be performed only in response to requests from devices (e.g., of the authorizers, as discussed below) that have been certified by the SWA signature. Signing devices themselves may make requests to other signing devices. By this procedure, the signing devices themselves become the first devices certified by the system wide authority (SWA) as a whole, using the herein defined multi-step signature process.

In an alternative embodiment of the foregoing recertification process, the group of target devices might submit their recertification requests (unsigned certificates) prior to the initial key generation by the lead device. The lead device would sign these certificates at the time it creates the SWA private signing key prior to splitting it into fragments and erasing the whole key. There does not seem to be any major advantage in doing this, as the main function of the resulting system is to sign such certificates in a highly controlled yet efficient manner.

AUTHORIZING AGENT RECERTIFICATION

Figure 8:
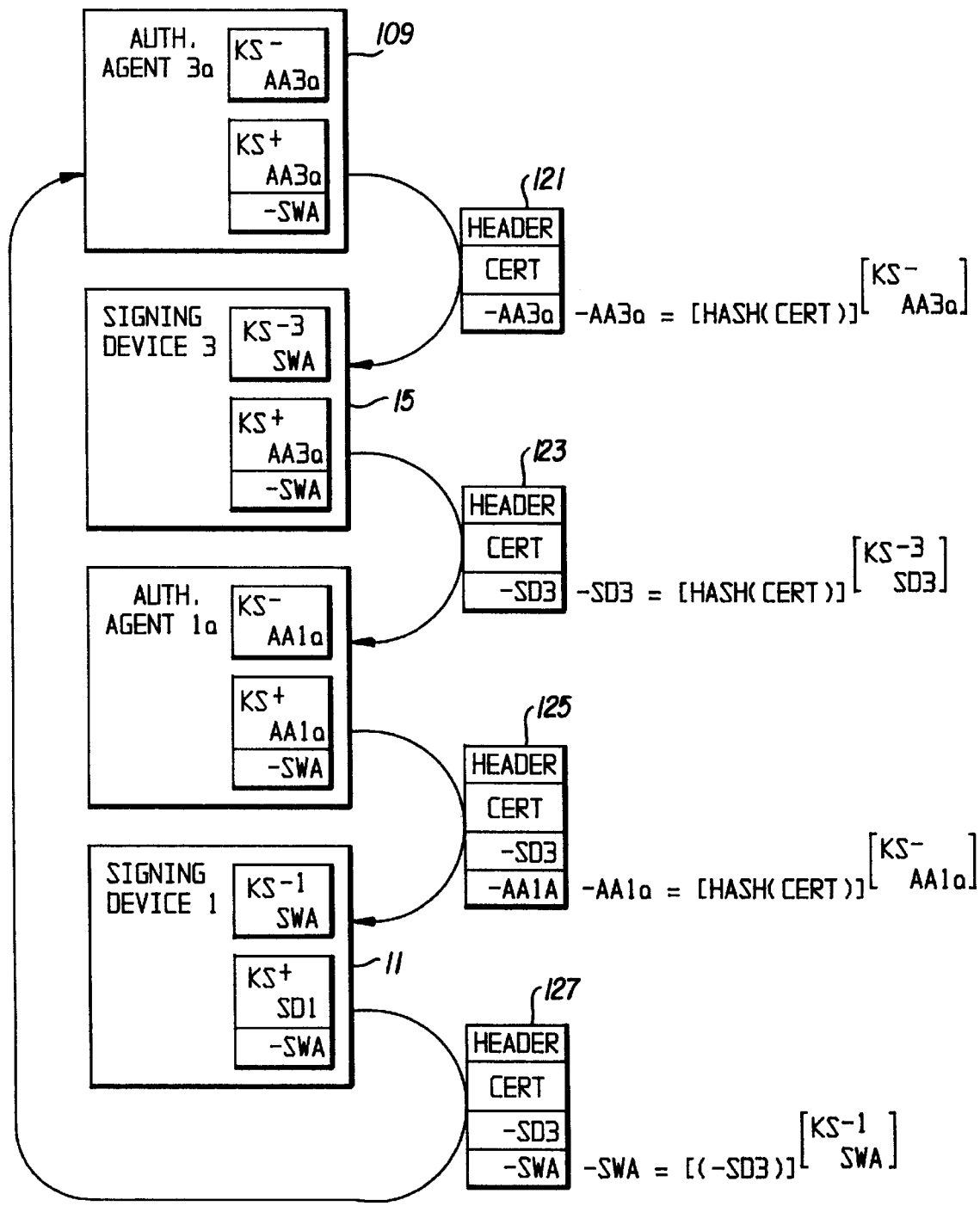
FIG. 8 illustrates a multi-step signature procedure using authorizing agents.

FIGS. 7 and 8 illustrate steps for certifying and registering authorizing agents. FIG. 7 shows an overall system architecture, while FIG. 8 illustrates the processing sequence for a certification request. Signing devices will affix the system wide authority official signature to authorizing agent certificates, thus certifying a public signature verification key for each authorizing agent. In the registration process, each signing device will also update an internally-stored table of particular authorizing agents who will be empowered to instruct the signing device to apply its partial signature. During routine operation, a signing device will affix its partial signature only if the request is signed by a minimum number of temporarily certified or SWA certified authorizing agents (or if a minimum number of individually signed messages are received) as discussed more fully below. An example of the process for certifying Authorizing Agent 3a (AA3a) and registering AA3a with Signing Device 3 proceeds as follows. For purpose of illustration, it will be assumed that Signing Devices 3 and 1 (FIG. 7, items 15 and 11) are the 2 of 5 signing devices selected to affix the SWA signature.

1) Authorizing Agent 3a 109 submits a recertification request for himself (FIG. 8, item 121) to Signing Device 3 through the LAN/WAN 21. (Alternately, authorization and/or registration can be restricted to direct input to the signing device through a limited access communication channel, e.g., direct connection to a stand-alone personal computer). The certification request includes at least the following information: a) authorizing agent name (human's distinguished name); b) identification code for the agent's trusted device (e.g., smart card serial number and model number); c) a signature verification key for the human agent (as initially signed by the temporary administrator); and d) a signature verification key for the agent's trusted device, which serves as an assurance that his device is of a known type. Such assurances are particularly critical when all or substantially all operations are performed at widely separated locations, such that the system operators cannot verify anything via visual inspection.

2) Signing Device 3 15 affixes a partial SWA signature (-SD3) to the certificate 121, and transmits the partially-signed certificate 123 to another of the authorizing devices.

3) Authorizing Agent 1a authorizes that the partial certificate 123 can now be sent to Signing Device 1 11.

4) Signing Device 1 completes the signature process using its share 93 of the SWA signature key.

5) Signing device 1 returns the fully-signed certificate 125 to Authorizing Agent 3a.

6) Signing Device 1 retains a copy of the signed certificate 127, enters AA3a in a log of authorizing agents (not shown), and returns the signed certificate 127 to the Authorizing Agent 3a.

The process is repeated for all authorizing agents which are to be registered with Signing Device 3, leaving each authorizing agent with a signed certificate and leaving Signing Device 3 with a log of all certificates. The process is repeated for all authorizing agents of the other signing devices 11, 13, 17, 19.

MULTI-STEP SIGNING

At this stage, signing devices have been initialized with shares of the SWA private signature key. Signing devices have recertified themselves, and authorizing agents have been both recertified and registered with their respective signing devices. The system is now ready to enter routine service for both system administration and official certification functions. In the following discussion, multi-step signing will be described for the system wide authority key, which typically will be used for system administration. As will be discussed below, additional "master keys" will also be generated and used for multi-step signing within the same family of devices, in the same way as for the system wide authority key, except that the content of messages to be signed by such master keys may not be administrative in nature.

Figure 9:
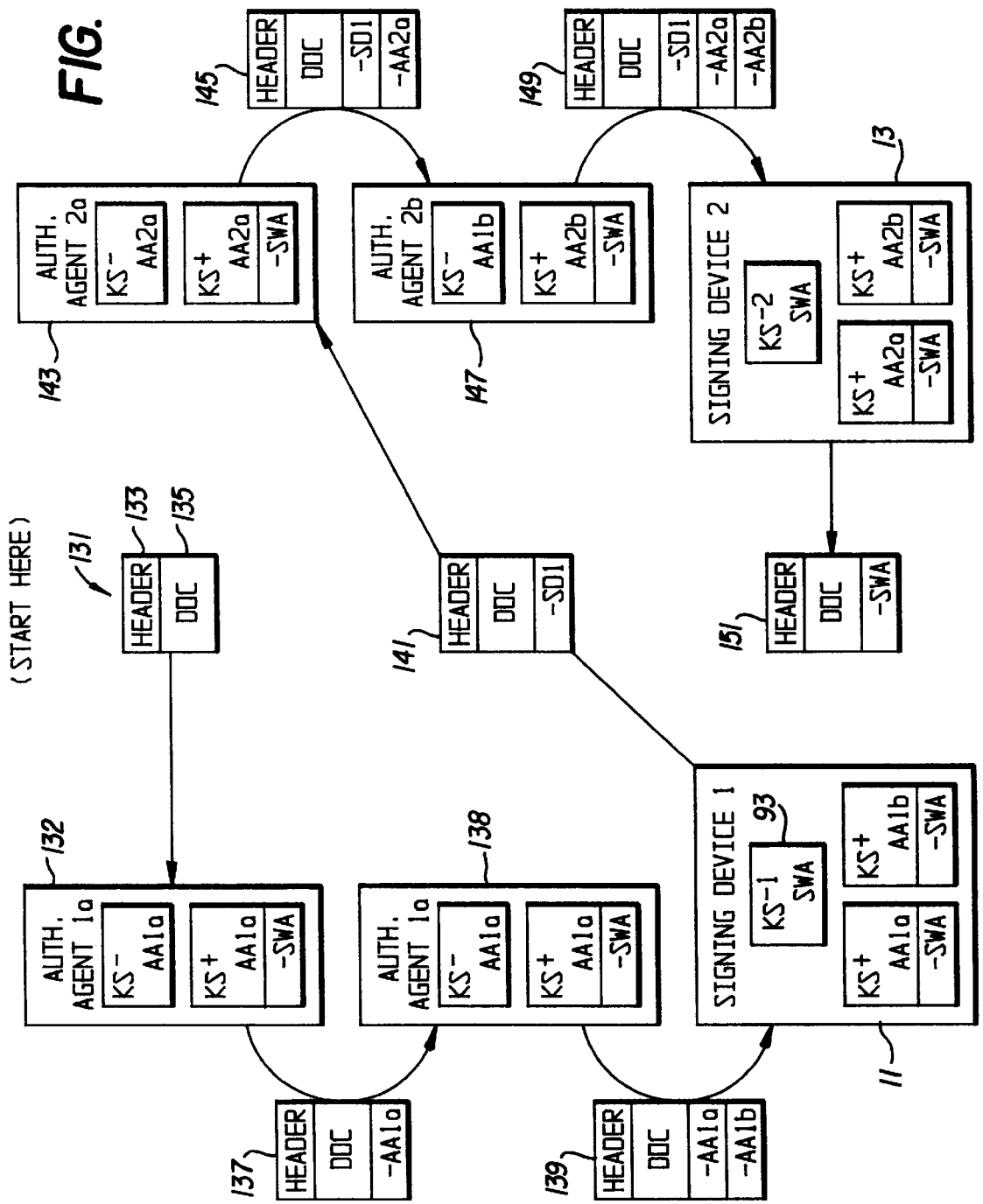
FIG. 9 illustrates the flow of a document through various authorizing agents and signing devices during routine multi-step signature operations.
Figure 10:
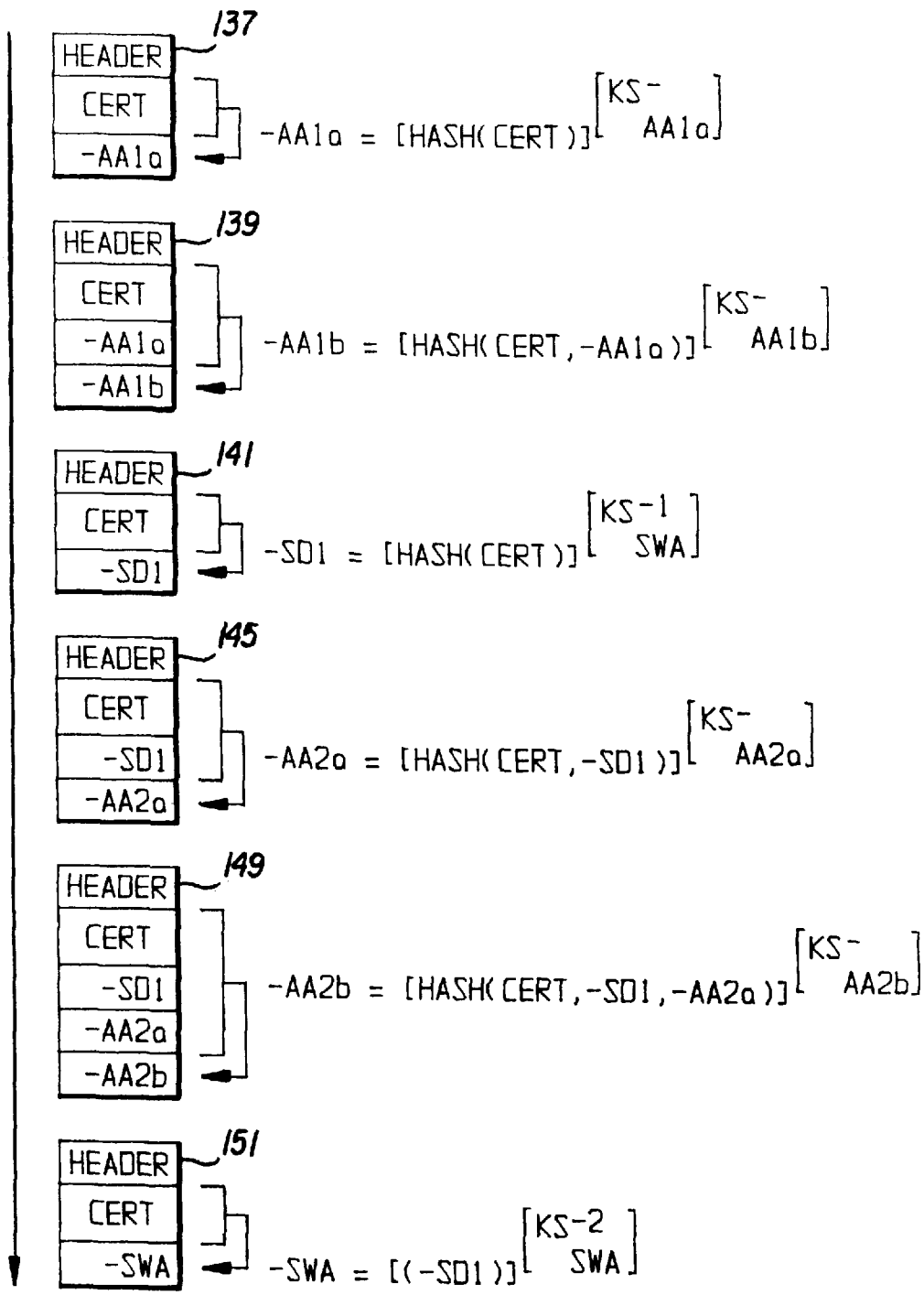
FIG. 10 illustrates the evolution of signatures on a document during routine multi-step signature operations.

FIGS. 9 and 10 illustrate multi-step signing using the system wide authority key. FIG. 9 illustrates the flow of a document ("DOC") through various authorizing agents and signing devices, while FIG. 10 illustrates the evolution of signatures on the document. This example assumes that Authorizing Agents 1a and 1b authorize Signing Device 1 to affix a partial signature, and that Authorizing Agents 2a and 2b authorize Signing Device 2 to complete the SWA signature. For simplicity, we assume that any two authorizing agents are needed to activate each signing device. The sequence proceeds as follows.

1) Authorizing Agent 1a receives a request for a signature through the WAN/LAN. The request is an electronic message 131 having a header 133 and the document to be signed 135. The header will contain a command code that designates the message as a signing request.

2) Authorizing Agent 1a (FIG. 9, item 132) strips off the header and performs a number of procedural checks to determine whether the document should be signed. The specific procedural checks, which may include the judgment of the human operator AA1a and which may vary depending on the underlying purpose of the document, are not germane to the multi-step signature process itself. When satisfied that the document should be signed, Authorizing Agent 1a signs the document using the agent's secret signature key (which was recertified under the SWA signature). As shown in FIG. 10, Authorizing Agent 1a's signature (--AA1a) is determined by hashing the document and exponentiating the hash using AA1a's secret signature key. AA1a then affixes a new header and sends the signed certificate 137 to Authorizing Agent 1b (another agent for the same signing device as Authorizing Agent 1a).

3) Authorizing Agent 1b (FIG. 9, item 138) strips off the header and performs a number of procedural checks (not germane to multi-step signing) to determine whether the document should be signed. When satisfied that the certificate should be signed, Authorizing Agent 1b also signs the document. As shown in FIG. 10, AA1b's signature (--AA1b) is determined by: 1) hashing the concatenated combination of the document and AA1b's signature; and b) exponentiating the hash using AA1b's signature key. AA1a's signature is left on the document as an audit trail. AA1b then affixes a new header and sends the twice-signed document 139 to Signing Device 1 (FIG. 9, item 11).

4) Signing Device 1 receives the twice-signed document 139, strips off the header and verifies that the document bears the necessary number of signatures of its registered authorizing agents (in this example, two). If so, Signing Device 1 strips off the signatures of authorizing agents and affixes a partial SWA signature. As shown in FIG. 10, the partial SWA signature (--SD1) is determined by hashing the base document (without authorizing agents signatures) and exponentiating the hash using Signature Device 1's SWA signature key share 93. Signing Device 1 then affixes a new header, and sends the partially signed document 141 to an authorizing agent for another signing device, here Authorizing Agent 2a of Signing Device 2.

5) Authorizing Agent 2a (FIG. 9, item 143) strips off the header and performs a number of procedural checks (not germane to multi-step signing) to determine whether the document should be signed. When satisfied that the certificate should be signed, Authorizing Agent 2a signs the document. As shown in FIG. 10, AA2a's signature (--AA2a) is determined by: 1) hashing the concatenated combination of the certificate and the partial SWA signature (--SD1); and b) exponentiating the hash using AA2a's recertified signature key. The partial SWA signature of SD1 is left on the document. AA2a then affixes a new header and sends the signed certificate 145 to Authorizing Agent 2b (FIG. 9, item 147).

6) Authorizing Agent 2b (FIG. 9, item 147) strips off the header and performs a number of procedural checks (not germane to multi-step signing) to determine whether the document should be signed. When satisfied that the document should be signed, Authorizing Agent 2b signs the document. As shown in FIG. 10, AA2b's signature (--AA2b) is determined by: 1) hashing the concatenated combination of the certificate, the partial SWA signature and AA2a's signature; and b) exponentiating the hash using AA2b's recertified signature key. The partial SWA signature and AA2a's signature are left on the document. b then affixes a new header and sends the signed certificate 149 to Signing Device 2 (FIG. 9, item 13).

7) Signing Device 2 receives the signed document 149, strips off the header and verifies that the certificate bears the necessary number of signatures of its registered authorizing agents (in this example, two). If so, Signing Device 2 strips off the signatures of its authorizing agents and modifies the partial SWA signature to complete the SWA signature. As shown in FIG. 10, the completed SWA signature (--SWA) is determined by exponentiating the partial signature affixed by Signature Device 1 (--SD1) using Signature Device 2's SWA signature key share 95. Signing Device 2 then affixes a new header, and sends the partially signed certificate 151 to AA1a (the originating authorizing agent).

In the example described above, two signing devices were necessary to affix the system wide authority signature, and each signing device required authorization from two authorizing agents. The total number of signing devices needed to complete a signature in the system may be adjusted at the time the key shares are generated, and threshold numbers of authorizing agents for each signing device may also vary. For example, it may require 3 signing devices of five to complete the system wide authority signature, and the number of authorizing agents necessary to authorize a signing device may vary for each signing device, depending on the level of human review desired for security purposes.

After having established a multi-step signing process as discussed above, certain core administrative actions can be taken conditioned on the "assent" of a quorum of other signing devices as authorized by the presence of the system wide authority key. Some of these administrative actions are discussed below. To effectuate such actions and decisions, the firmware inside each tamper resistant signing device will be programmed to respond only to commands signed:

1. in the case of partial signing requests, by a proper quorum of authorizing agents; and
2. in the case of system administrative changes, by the system-wide authority itself.

That is, in the preferred embodiment, no changes can be made in the list of authorizers or related requirements on any signing device by other than the consent of a quorum of authorizers on a quorum of all signing devices. In some cases, it may be deemed unduly burdensome to obtain the consent of the entire system for certain minor changes, such as authority to perform encrypted backups. However, it is anticipated that such administrative changes will generally be relatively few and infrequent, in contrast to the volume of official business, and that the security of the system demands that such consent should be normally obtained in all cases. Note that in the example, only 4 human signatures were required to (re)certify and (re)register a user.

PARALLEL SIGNING

FIG. 11 illustrates the flow of a document during a parallel embodiment of the multi-step signing system. In this illustration, it will be assumed that there are a total of three signing devices 169a, 169b, 169c in the system, and that all three signing devices are required to complete the system wide authority (SWA) signature. It will be understood that parallel signing can be adapted to differing numbers of signing devices.

In the parallel method, a document coordinator 161 ("the coordinator") receives a document to be signed 163. The coordinator may but need not be an authorizing agent for one of the signing devices, but the coordinator is illustrated as a separate entity for generality.

The document coordinator 161 generates three copies (or in the alternative, three copies of a hash of the document) 165a, 165b, 165c of the document to be signed 163. Each copy is sent to a first authorizing agent 167a, 167b, 167c, then to a second authorizing agent 171a, 171b, 171c, then to one of the three signing devices 169a, 169b, 169c, and finally is returned back to the coordinator 161. In a manner discussed more fully below, the document coordinator combines the separate signatures of the three signing devices and produces a system wide authority signature (--SWA) which is affixed to the original document 163 to produce a signed document 173.

Figure 12:
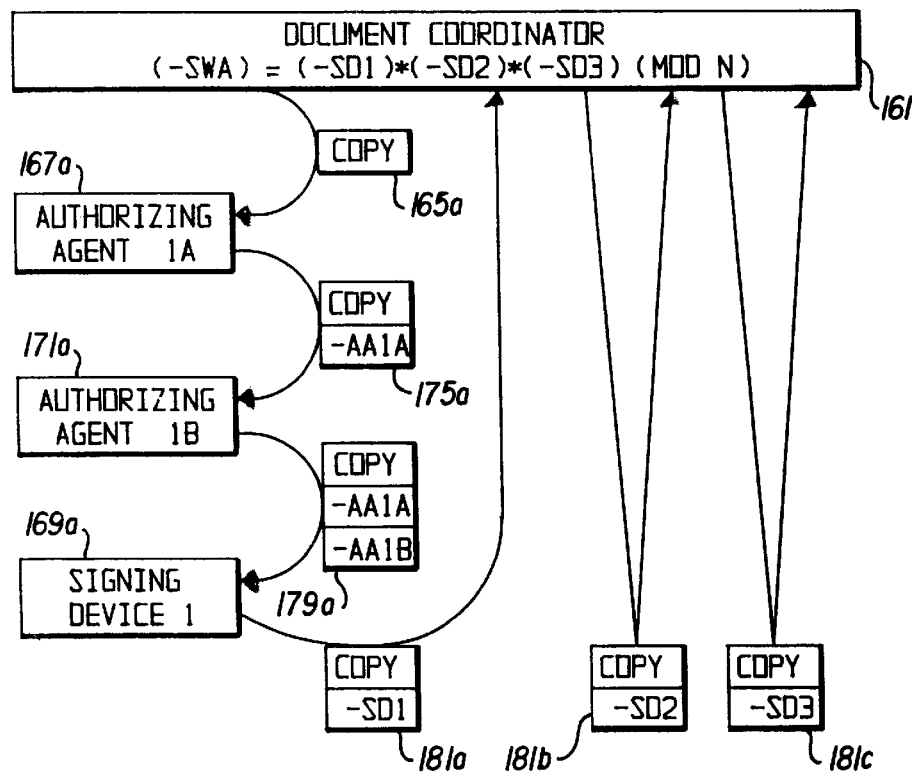
FIG. 12 illustrates the processing of one of the copies, and the combination of the three partial signatures into the system wide authority signature.

FIG. 12 illustrates the processing of one of the copies, and the combination of three partial signatures into the system wide authority signature. It should be understood that each of the copies undergoes processing that is essentially the same, except that differing authorizing agents and signing devices will affix signatures, or partial signatures, according to their individual signature keys.

In this example, two authorizing agents are required to authorize their respective signing device 169a to affix its signature. The coordinator 161 sends a first copy 165a of the document to be signed, along with a routing and information header (not shown) to a first authorizing agent 167a, who affixes his signature (--AA1a) and sends the signed copy 175a to a second authorizing agent 171a. The second authorizing agent 171a adds a second authorizing signature and sends the (twice signed) document 179a to the signing device. The signing device 169a verifies the two authorizing signature, affixes its partial signature (--SD1) to the copy, and returns the signed copy 181a to the coordinator 161.

Two other signing devices (not shown) affix partial signatures to copies of the document to be signed and return the signed copies 181b, 181c to the coordinator. All three copies may be processed in parallel.

After the coordinator has received all three copies 181a, 181b, 181c of the document to be signed, the coordinator multiplies together the three partial signatures (--SD1, --SD2, --SD3). The product of the three partial signatures is the system wide authority signature (--SWA).

The signing device and the smart cards of the authorizing agents will be trusted devices. The security of this parallel multi-step signing method does not depend on the physical security of the coordinator's workstation. The coordinator need not possess any secret keys for authorizing the signing devices (although it will likely have routing encryption and signature keys for privacy and identification purposes).

The functions of the coordinator may spread among authorizing agents. A first authorizing agent may receive the original document to be signed and designate another authorizing agent (or even another entity which is not an authorizing agent, such as a server for one of the signing devices) to receive and combine the partial signatures. It is expected that the normal operation of the organization will make it preferable to have the coordinator both receive the document to be signed, and then be responsible for delivering the signed document to its ultimate recipient.

ADDING/DELETING AUTHORIZING AGENTS

Each signing device has an associated group of authorizing agents. Because people come and go in an organization, the system includes provisions to add and delete authorizers dynamically by adding and deleting the public keys of the authorizing agents' trusted devices. Adding, or deleting an authorizing agent is accomplished by submitting, to a signing device, a command to add or delete a public key of the agent. The command takes the form of an electronic message having a code for the add/delete command, additional information (discussed below) and authorizing signatures.

The authorizing signatures may be from other authorizing agents of the same signing device, and the add/delete process can be completed locally by a single signing device. In an alternate version, the add/delete procedure may require the signature of the system wide authority key, thus requiring quorums of authorizing agents on a quorum of related signing devices to approve and authorize the change. In yet another alternative, different authorizing agents may have differing capabilities, and some more powerful authorizers may be added or deleted under the system wide authority key, while less capable authorizers may be added or deleted locally under the authority of a local quorum. Preferably, the addition or deletion of authorizing agents requires the signature of the system wide authority key.

Figure 13:
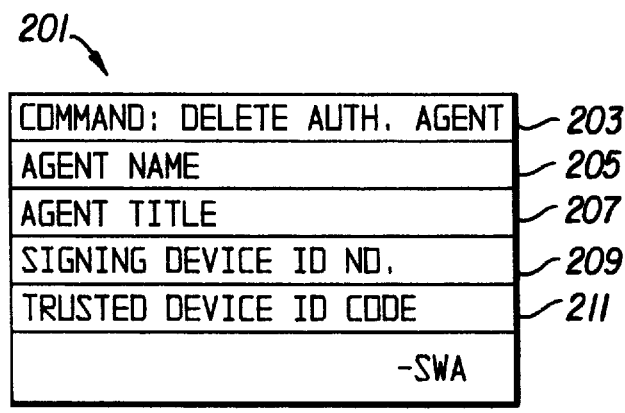
FIG. 13 illustrates a command for deleting an authorizing agent.

FIG. 13 illustrates a command 201 for deleting an authorizing agent. The additional information with the command 203 includes: a) the agent's name 205; b) the agent's title 207; c) the ID number 209 of the signing device from which the agent will be deleted; and d) the identification code 211 of the trusted device associated with the authorizing agent to be deleted. After receiving a properly signed command, the signing device deletes the authorizing agent's public verification key from its internal lists of authorizing agents.

Figure 14:
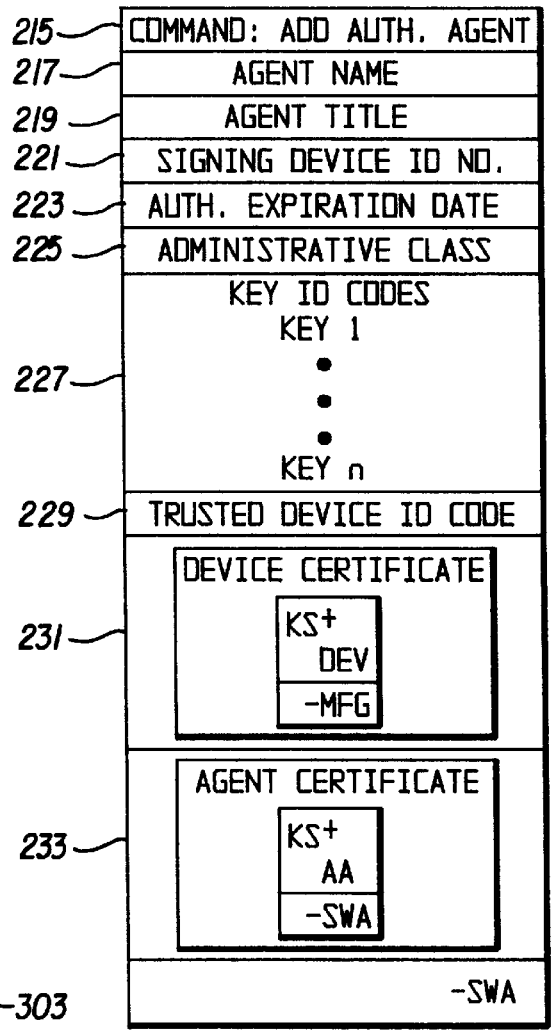
FIG. 14 illustrates a command for adding an authorizing agent.

FIG. 14 illustrates a command 213 adding an authorizing agent. The additional information includes: a) the agent's name 217; b) the agent's title 219; c) the ID number 221 of the signing device for which the agent is authorized 221; d) an administrative class 225 indicating powers for which the agent is authorized; e) an expiration date 223 for the new agent's authority; f) identification codes 227 for the master key or keys which the authorizing agent may instruct the signing device to apply; g) ID code 229 of the agent's trusted device; and h) a certificate 231 with the trusted device's public signature verification key. Preferably, the pubic key of the new agent is certified 233 under the authority of the SWA signature key and the certificate is included with the command. The device certificate 231, signed by the manufacturer of the trusted device associated with the authorizing agent, also includes an assurance that the authorizing agent's private signature key is permanently confined in a smart card or other trusted device having approved minimum security properties. (Preferably, the device's minimum security properties will also include the fact that biometric information is used to link the smart card to a physical characteristic of the human user. For example, the manufacturer might state that the card will not create its user signatures unless the user activates an attached fingerprint reader, where the matching fingerprint data is stored inside the card and used to activate it.) After receiving a properly-signed request (i.e., after SWA multi-step signing has been completed), the signing device will add the new agent's information to its internal lists of authorizing agents.

ADD/DELETE CARD MANUFACTURERS AND MODELS

As discussed above, authorizing agents act through trusted devices, which may be smart cards manufactured with predetermined security properties. As a condition for adding an authorizing agent, the agent's trusted device must be of an approved model. During the initiation of the system, model numbers of trusted devices that would be acceptable for use in the system were input. Over time, new models will become available, and security procedures may be tightened such that older models may no longer be acceptable. All signing devices maintain an internal table of accepted models.

New manufacturers may be added by circulating an electronic request among all the signing devices to add a new manufacturer. FIG. 15 illustrates a sample request. The request includes a command 243 along with the manufacturer's name 245, the model name or code 247, and a public signature verification key 249, bound together in a message 241 signed by the system wide authority key.

Old manufacturers may be deleted by circulating an electronic request, signed by the SWA key, to remove the manufacturer's public verification key from the tables of the signing devices. FIG. 16 illustrates a sample request 251 which includes a command 253 and the manufacturer's name 255. These add/delete requests, once signed by a quorum of devices, are then sent to all devices, which then verify them using $K^+_{SWA}$ and act upon them.

New models for an already-approved manufacturer may be added by submitting an electronic request, signed by the SWA key, to add a new model. FIG. 17 illustrates a sample request 261. The request will include a command 263; the manufacturer's name 265; the model number 267 and a certificate 269, signed by the manufacturer, that the particular model meets certain security standards (e.g., a certificate that a model satisfies FIPS level 3 requirements).

Old models may be deleted by submitting an electronic request, signed by the SWA key, to remove the model from the tables of the signing devices. FIG. 18 illustrates a sample request 271, which includes: a command 273; the manufacturer's name 275; and the model number 277.

ADDING/DELETING SIGNING DEVICES

Over time, it will be desirable to add or delete signing devices from the system. Each signing device contains a table of other signing devices in the system that hold shares of the SWA key (or shares of another master key for multi-step signing as discussed more fully below). The identity of each signing device is defined by: 1) the device identification number (e.g., serial number); 2) the device public verification key (installed by a manufacturer and certified under the manufacturer's signature, or a similar key recertified by the SWA signature); 3) the device public encryption key (used to send encrypted messages to the device); and 4) any subsequent certified public keys uniquely in its possession.

Figure 19:
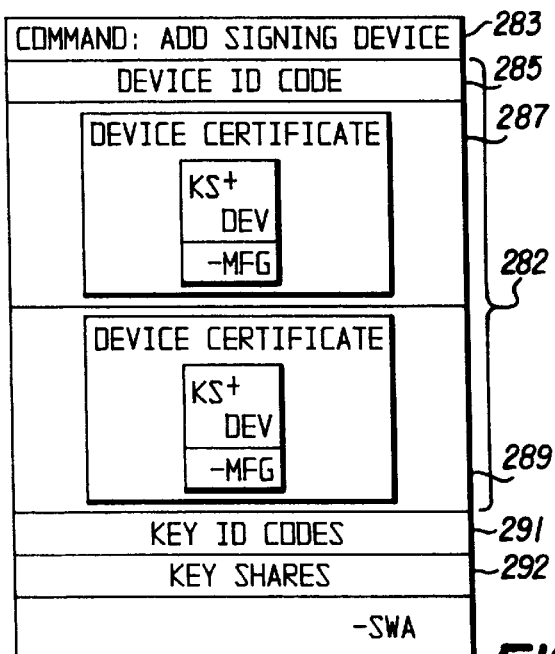
FIG. 19 illustrates a sample instruction which includes a command to add a signing device.

New signing devices are added to the system by circulating an unsigned certificate among other devices to receive the SWA signature and then circulating the signed certificate. The certificate contains the identifying information as discussed above. After the certificate has been signed by the SWA key, the certificate is sent to all other signing devices with an instruction to add the new device to the other signing device's internal tables. FIG. 19 illustrates a sample instruction 281, which includes a command 283 and a certificate 282. The certificate includes: the new signing device ID code 285; a signature verification key certificate 287 of the signing device (singed by the manufacturer); and an encryption key certificate 289 of the signing device (also signed by the device manufacturer). The signature verification key and encryption key could also be in a single certificate. Other information must be circulated among other signing devices, such as the identities of key shares 291 used by the new signing device and shares of decryption keys 292 escrowed with the new device. Once a signing device is added to the group, it can: 1) participate in protocols to generate a new master key and receive a share of it; 2) serve as a backup unit to receive the contents of a signing SD; or 3) serve as a replacement unit to receive the restored contents of a revision backed up signing device that has either been destroyed or removed from service.

Figure 20:
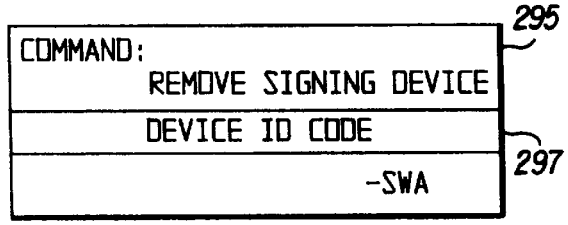
FIG. 20 illustrates a message for removing a signing device.

FIG. 20 illustrates a message 293 for removing a signing device. The message 293 includes a command 295 and the device ID code 297.

COPY KEY SHARES

The risk (consequences) of theft or destruction of signing devices has been reduced by virtue of the multi-step signing process and the fact that no single signing device is capable of forging a signature or divulging information sufficient to forge a signature. The information content of a signing device, including the SWA key share, can therefore be transferred to another device, e.g., when upgrading signing device hardware or for back-up purposes.

Figure 21A:
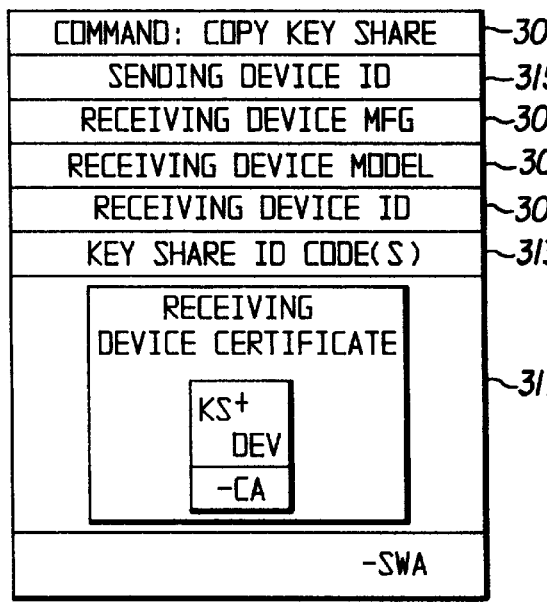
FIG. 21A illustrates a sample request to a sending device to copy its key share(s).
Figure 21B:
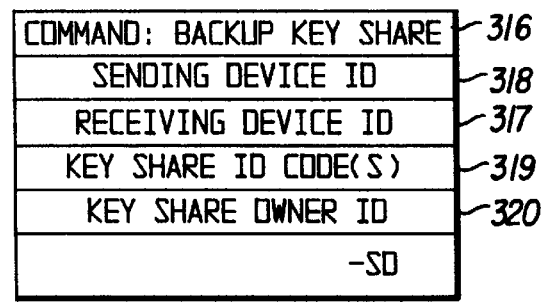
FIG. 21B illustrates a sample message from a sending device to a receiving device.

Copying of key shares and other information is accomplished by submitting a request, signed by the SWA key, to copy all or some of the information in a particular signing device to a second device. FIG. 21a illustrates a sample request to a sending device to copy its key share(s). The request 301 preferably includes: a command 303, signed by the SWA key, identifying the second device by manufacturer 305 (which must already be included in the signing devices list of approved manufacturer), model number 307 (which must already be an the approved list of models), and serial number 309; a certificate 311 with a public encryption key for receiving device; ID codes 313 of the key shares (or other designation of information) to be copied; and the sending device ID 315. When the signed request is received by the proper sending device, the sending device encrypts the identified key share(s) and related information using the public encryption key of the receiving device, and then the sending device outputs the encrypted information as an "add key(s)" message to the receiving device. FIG. 21(b) illustrates a sample message from a sending device to a receiving device. The request 314 preferably includes: a command 316, signed by the sending device (--SD); the receiving device ID 317; the sending device ID 318; the ID codes of the encrypted key shares 319; and the ID code of the key share owner 320. The receive share command could also specify a quorum (or other authorization details) for use on the receiving device, but preferably, the received key will be used in accord with default quorum of the receiving device. As a typical operative procedure, all systems operators and authorities would be informed that a copy has been made, along with the identity of the device or storage medium holding the copy.

Alternately, the information may be copied to a storage device which is kept physically secure (e.g., stored in vault) and off-line (not subject to remote attack) in encrypted form for use as backup.

CHANGE QUORUM REQUIREMENTS

The quorum of signing devices needed to affix the SWA key is a system design parameter used by the lead device when generating key shares. This quorum can be changed by re-combining the key shares to recover the whole signature key, and then splitting the key into an increased number of shares which are then re-distributed as with the original key shares, but with a new quorum requirement.

The quorum of authorizing agents needed to authorize a particular signing device to affix a partial signature can be changed without reinitializing the system. Such a change preferably is accomplished by submitting a request to the respective signing device signed by the SWA key. Alternately, authorizing agents of a particular signing device may change the local quorum by submitting a request signed only by local authorizing agents. The number of signatures needed to change the quorum may be the same as or different from the number needed to authorizing the signing device to affix the SWA signature. Note that if SWA key shares are stored within signing devices in encrypted form and if authorizers hold decryption key shares as discussed below, the quorum needed for authorizing a signature should not be reduced to less than the number of shares needed to decrypt the SWA key share. In normal banking practice, the N of authorities must not be less than 2 per signing device, although some authorizers may have rights on multiple signing devices.

ENCRYPTING STORED KEY SHARES

Figure 22:
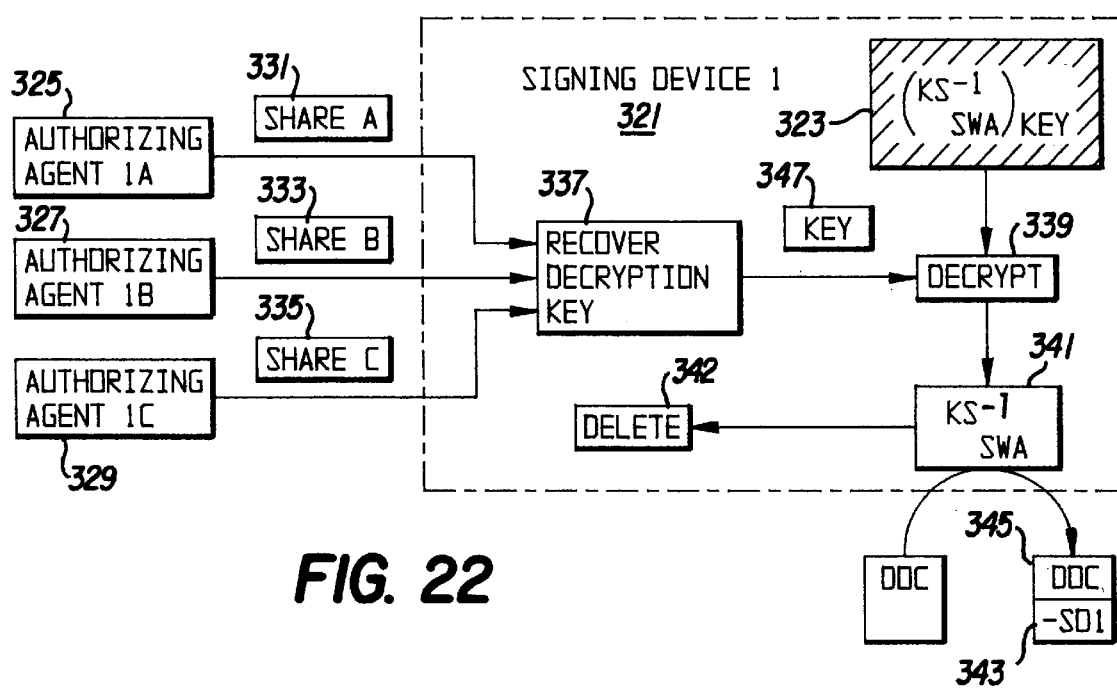
FIG. 22 illustrates a process for encrypting stored key shares.

In this variation, shown in FIG. 22, each SWA key share stored within a signing device 321 is stored in an encrypted form 323. The decryption key ("KEY") is split into shares, and each authorizing agent's trusted device 325, 327, 329 stores a share of the decryption key. As discussed above, each request for the signing device to affix a partial signature must be accompanied by signatures of a quorum of authorizing agents. Under this variation, the authorizing agents additionally send a share of the decryption key 331, 333, 335 to the signing device 321. The signing device then:

1) combines the decryption key shares 337 to recover the decryption key 347;

2) decrypts 339 its share of the SWA key;

3) uses the plaintext SWA share 341 to affix a partial signature 343 to a document 345;

4) erases the decryption key 347;

5) erases the shares 331, 333, 335 of the decryption key; and 6) erases 342 the plaintext SWA key share 341.

When sending a document to a signing device for signature, an authorizing agent includes that agent's share of the decryption key and signs the message. In normal operation, the decryption key shares are protected due to the fact that all communications on the network are encrypted using the public encryption key of the recipient (i.e., of another authorizing agent when a document is being circulated for agents signatures, or of a signing device when submitted for signing). Alternately, each authorizing agent may develop a session key for each message in order to protect the decryption key shares. (That is, each time a key-containing message passes from an authorizing agent to another authorizing agent or to a signing device, a new session encryption key is used.) The entire message is then encrypted under the session key.

In this way, the plaintext SWA key share exists only transiently during the time that it is being used to affix a partial signature. Furthermore, the decryption key, and a complete assembly of shares of the decryption key exist only transiently. If a signing device is stolen, thieves would at best be able to recover the encrypted form of the SWA key share.

Figure 23:
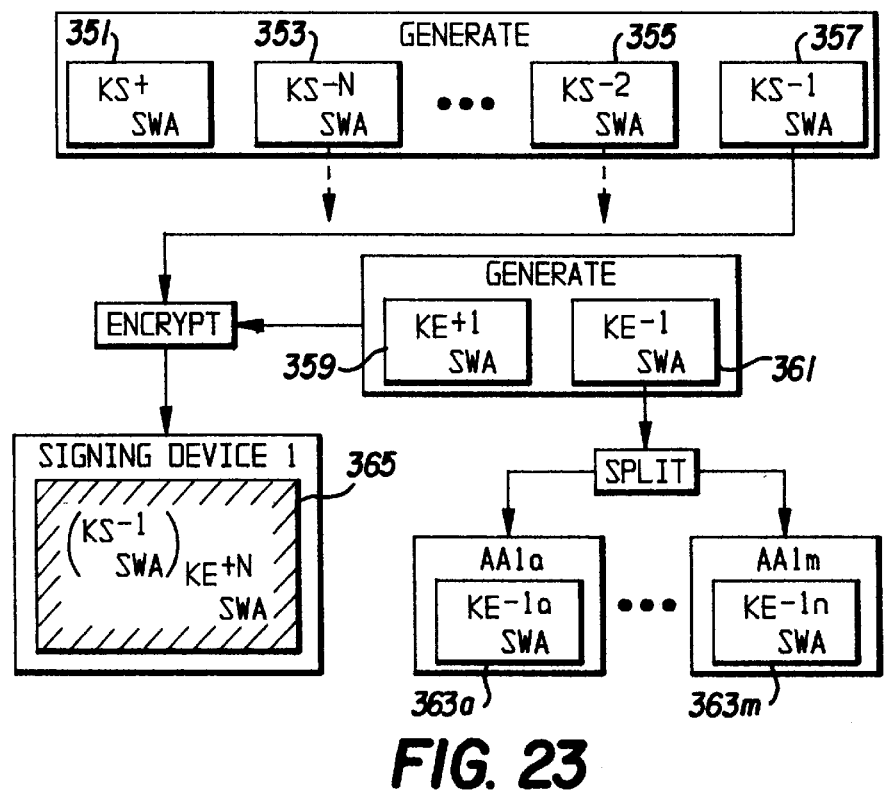
FIG. 23 illustrates a process for generating and distributing encrypted key shares and shares of decryption keys.

The process for generating and distributing encrypted key shares and shares of decryption keys would proceed as follows and illustrated in FIG. 23.

1) The lead device generates a public SWA verification key 351 and shares 353, 355, 357 of a private SWA signature key as discussed above for the basic variation.

2) The lead device generates a separate public/private encryption key pair 359, 361 for each private share of the SWA signature key (one SWA share 357 is illustrated, and it should be understood that other shares are processed similarly).

3) For each private encryption key, the lead device splits the private decryption key into shares 363a, . . . , 363m using an L of M split where M is the total number of shares and L is the minimum number of shares needed to reconstruct the private decryption key. M may be chosen to equal the total number of authorizers on a signing device, while L equals the quorum of authorizing agents needed to authorize a signature on the respective SWA key share.

4) The lead device encrypts each share of the SWA signature key 357 under the associated public encryption key 359, and sends an encrypted share 365 of the SWA signature key to a respective signing device along with M shares of the respective private decryption key.

5) The private decryption key shares for the SWA key shares may also be escrowed (distributed for safe keeping) among the other signing devices such that any private decryption key can be recovered from the signing devices, but no one signing device contains enough information to recover any decryption key for another device. Such general shares for any given signing device would be released and upon consent of a quorum of authorities on several other SDs.

6) The lead device erases the private decryption keys, the private decryption key shares, and the whole private SWA signature key (if it still exists) from memory.

When each signing device registers its respective authorizing agents, the signing device additionally sends each authorizing agent a decryption key share, identified by: 1) an identification number for the decryption key share; and 2) the identification number for the associated SWA key share.

For example, if there were five SWA signature key shares, (with three needed for a signature) and each SWA key share were encrypted under a separate public encryption key, and each SWA key share required three of five authorizing agents, then each decryption key could be divided into five shares with any three capable of recovering the decryption key. There would be twenty five decryption key shares, with each signing device having distributed five to its authorizing agents (for its own key) and holding one share of each of the decryption keys for the other four devices.

In this way, the quorum of authorizing agents needed to authorize a signing device to affix a partial signature will also have a sufficient number of decryption key shares to allow the signing device to decrypt the SWA key share transiently for each signing operation.

If one or more of the authorizing agents lose their keys (e.g., lose their trusted device smart cards), then new smart cards would be registered on the same signing device. The decryption key shares could be recovered from other signing devices and could be reinstated to the newly-registered smart cards by submitting an electronic message, signed by the SWA signature key, for the signature devices to transfer shares of the decryption key to the newly registered devices. As an alternate method, subject to the consent of the SWA, a given device could receive all decryption shares, decrypt its signing share, generate a new encryption key pair, re-encrypt the signing share under the public key, divide the new private decryption key into new shares and redistribute these shares to the trusted devices of the relevant authorities, taking care to encrypt them under the public encryption keys of those receiving authorities' trusted devices.

As an alternate back-up method, up the decryption key shares can be escrowed off-line with an independent trust institution as described in copending U.S. patent application Ser. Nos. 08/181,859 and 08/277,438.

CRYPTOGRAPHIC HEARTBEAT

As a further protective measure, each signing device receives a periodic data input ("heartbeat") which, if interrupted, causes the signing device to become deactivated. The heartbeat would be generated from a location separate from signing device so that, if thieves attempt to steal a signing device, they must also penetrate a separate room or vault to get the heartbeat source. If they fail to acquire the heartbeat source, the signing device becomes inactive and is useless.

In one implementation, each signing device provides an encryption key to a heartbeat source. The heartbeat source periodically sends encrypted messages to the signing device. If the signing device fails to receive a minimum number of messages over a period of time from the heartbeat source, then the signing device erases its internal memory or takes other evasive action. The messages may be empty messages or simple messages, which must be encrypted by the heartbeat source using the public key given to it by the SD. Alternately, the messages could be a pseudo random string generated in the heartbeat source by a pseudo random number generator (RNG) and verified by a synchronized (RNG) in the signing device.

Multiple heartbeat sources could be established so that a signing device must receive messages from at least one (or a minimum number) over a period of time. If one heartbeat source goes off-line due to equipment failure or power outage, it will not trigger premature erasure of signing device memories. Keys used in heartbeat communications may be backed up in shares to multiple locations.

In a second implementation, each signing device may send a query to a group of associated ("satellite") devices on the network, and continue operation only if at least a quorum of associated devices responds. Requiring a quorum allows operations to continue during inevitable outages and repairs to communications.

Use of satellite devices, while more complex, adds physical security and can be used at locations having less secure environments, rather then upgrading these facilities with vaults, guards, cameras, etc.

The communication link between a signing device and its heartbeat source or satellite device may be a public network. If a signing device is reported stolen, its associated satellite units can be deactivated by the system operators to prevent thieves from tapping communication lines and re-routing the heartbeats to the stolen device.

For example, the signing device may be in the United States and its associated satellite device in Europe. When the signing device is stolen, the European satellite device is taken off line by its operators. Liability of the European agent for any erroneous action would be minimal, because the removal of the satellite only interferes with new signing operations for a short time. Previously signed signatures remain in force. Alternately secure physical wiring can be provided between a signing device and its satellite or heart-beat source in lieu of a public network.

GENERATING ADDITIONAL MASTER KEYS

Having established a secure, multi-step signing system with a SWA key, it is a simple matter to generate a number of additional "master" keys to be used for other purposes. While the SWA signature key controls system administration, master keys can be used to sign other certified messages or documents by use on behalf of other legal entities. The generation and administration of other master keys is similar to the SWA key but without intermediate temporary certification steps. The method proceeds as follows:

1) Designate one signing device as "lead" (it need not be the same "lead" that generated the SWA signature key.

2) Input a list public key certificates of signing devices to receive shares of the master key.

3) Input an identification code for the master key and a logical name.

4) Establish secure communication channels among signing devices (preferably using the encryption key certificates of each related signing device).

5) Optionally obtain random material from each signing device.

6) Generate a new "master" public private key pair.

7) Distribute private keys shares (optionally encrypting each share and distributing shares of decryption key).

8) Erase the whole master private key (if it was stored), and erase all shares not retained by the lead signing device.

This process may also be used to replace the SWA signature, by additionally sending each signing device a command, signed by the (old) SWA signature key to install the new master key as the SWA signature key. Generally, the master key will have separate uses from the SWA key and the shares of many master keys may coexist in the signing devices. A previously generated master key (other than a SWA signature key) can be deleted from the system by submitting a message, signed by the SWA signature key, to delete the master key fragments.

DOCUMENT AND SIGNATURE TRACKING

It is desirable to assign a unique identification code to each document to be signed in order to assist in managing the flow of documents through the system. The following information may be included in the headers of each document for use by message servers and authorizers:

1) The signature key identification code of the key to be used to sign the document.

2) The total number of partial signatures needed to complete the signature and/or the number of partial signatures already applied.

3) The key fragment identification codes that have already been used to sign.

4) The identities of the signing devices that have already signed (e.g., the logical device names).

INTERLOCKING RINGS OF SIGNING DEVICES

A root CA, using a multi-step signing system as described above, will generally certify subordinate CAs located in other business and government organizations. Hypothetically, a large money center bank might certify a major agency of a state government. The state agency, in turn, might certify a corporation. This distributes the certification process flexibly in a way which can conform to existing political, economic and social organizations.

However, each mid-tier CA must maintain strong security over its signature key. Few such organizations, other than banks, some large corporations, and some government agencies, have traditionally maintained multiple highly secure data processing facilities and storage vaults. For example, a mid-tier CA may possess at least one nominally secure physical location, such as a data center or vault operation, but lack the funds to serve multiple sites for the multi-device schemes described above. In the alternative, the mid-tier CA may have no truly secure location.

Less secure mid-tier CA's (such as a corporate CA) may nevertheless set up their own signature-rings (as described above) and interlock these mid-tier rings with the more highly secure ring of a parental CA (such as a bank or secure government agency). This can be done while separating the issues of: (1) key ownership and official control, (2) administrative and backup responsibility, and (3) physical possession of the devices.

Figure 24:
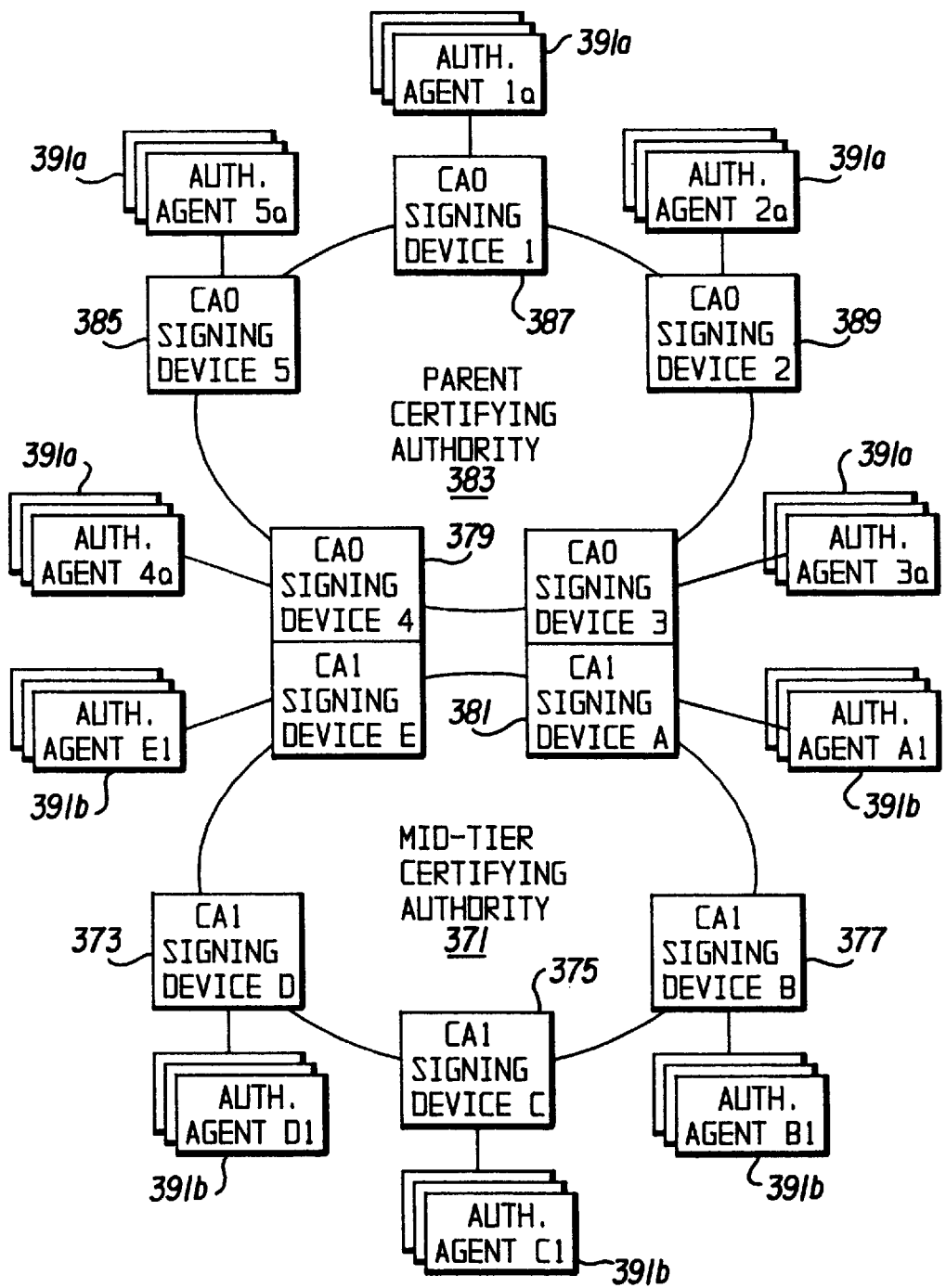
FIG. 24 illustrates an interlocking ring architecture.

An interlocking ring architecture can be created as shown in FIG. 24 by having a mid-tier CA 371 maintaining one or more mid-tier signing devices 373, 375, 377 in its own secure locations. Additional mid-tier signing devices 379, 381 will be maintained at the secure locations of a parent CA 383 and may even include some or all of the same devices 379, 381 that make up the parent (root) CA ring 383 (hence "interlocking rings"). The parent CA could maintain several signing devices 385, 387, 389 that are independent from those of any given mid-tier CA 383. The signing devices described above require no additional modification to hold additional master keys, each under different ownership and control by respective authorizing agents 391*a*, 391*b*, with supplemental master keys grouped in different ways.

The mid-tier CA initiates the key generation and share distribution protocol outlined above using one of its own signing devices as a "lead" device, and authorizes its own officers as authorizing agents 391*b*. Some shares of the new CA master key would reside on its own signing device(s) 373, 375, 377, while others would reside on signing devices of its parent CA 379, 381. The authority to issue signatures can remain vested solely in the officers of the key owner, although they could also delegate some of this authority to some officers of the parent CA institution, in case of emergency.

Thereafter, the mid-tier CA would initiate multi-step signing of the CA's signatures based on signatures generated by smart cards possessed by their officers, and route those requests to their own signing devices and/or to devices in the possession of the parent CA. Indeed, signing devices need not be located with the parent CA, but could be sited at any other CA also having a secure location and communication access.

FULLY LEASED SERVICES

An organization that does not possess even one secure facility might still wish to generate certificates and can still become a CA. The organization can lease use of signing devices located in secure locations already established by various banks or other CAs. The organization takes possession of smart cards for its authorizing agents, and routes signing requests to signing devices through a communication network. The processes of generating keys, issuing signatures, and performing other administrative tasks can therefore occur within devices under local bank physical control in accord with contractual trust arrangements with the owner.

The organization's officers would go to the local secure (banking) facility to witness the key generation protocol by which their new signature key is created, divided, and distributed to each of a number of host facilities (possibly other banks or other locations of the same bank) that they have selected. At that time they could also assign the appropriate administrative backup powers as needed.

The organization could then issue official signatures and certifications, without the need of establishing their own secure data center or vault facilities, while still achieving substantially all the security benefits of the system as described.

SIGNATURE DELEGATION

When an authorizing agent becomes temporarily unavailable (due to being on vacation, incapacitated, etc.), some form of delegation of signatory authority is desirable. It is undesirable for a human operator to loan his/her smart card—and an associated pin number or key—to another, because that creates an un-managed security risk.

One alternate delegation mechanism is for an original authorizing agent ("primary user") to issue a specialized "delegation" certificate to a substitute authorizing agent ("delegate"). The certificate, signed by the primary user, would identify the delegate and the delegate's public signature verification key. The delegation certificate would also contain a time limit during which the delegation certificate (and hence the delegate's authority) would be valid. (See Sudia & Ankney, "Commercialization of Digital Signatures," 1993.) A delegate, using his/her personal smart card, would sign a document using the delegate's personal signature key and would attach the delegation certificate. Resulting documents would be signed by the delegate, not the primary user, and a document recipient must undertake additional steps to verify the delegate's signature and the delegate certificate. This relies, in part, on an ability for all public users of a system to have such verification capability and, to have good access to a source of revocation information (or "hot list"), in case the authority must be cancelled before it expires.

A preferred approach is to allow a delegate to use the primary user's smart card in a secure way that, in effect, substitutes the human delegate for the human primary user vis-a-vis the primary user's smart card. Then, the delegate would use the primary user's smart card to affix the primary user's signature, and the universe of document recipients is spared the additional burden of verifying and evaluating another complex certificate.

Figure 25:
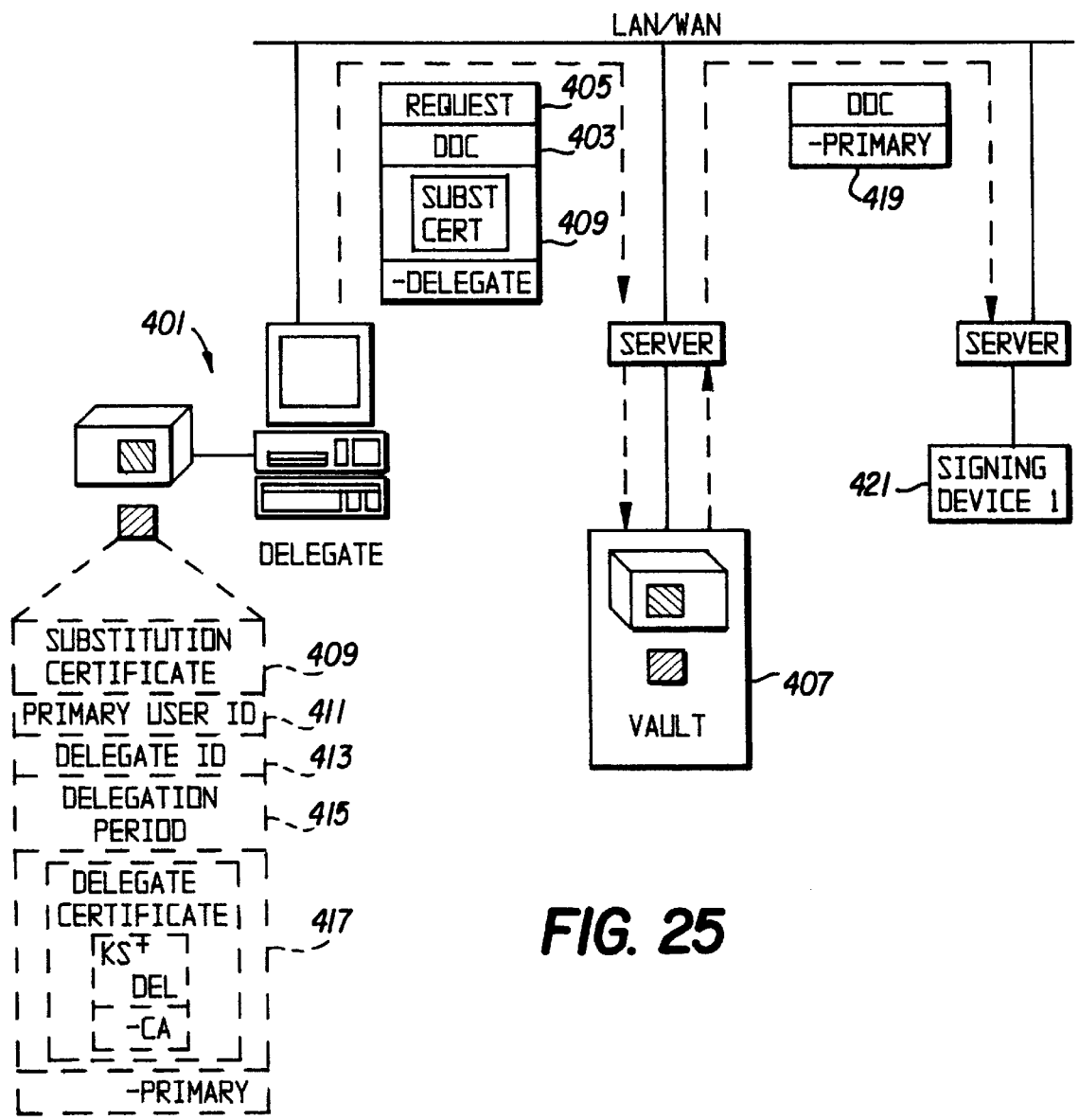
FIG. 25 illustrates a process for issuing a substitution certificate to delegate signatory authority.

When the primary user wishes to delegate signatory authority, the primary user issues a "substitution" certificate 409 to the delegate as illustrated in FIG. 25. The substitution certificate identifies the primary user ID 411, the delegate ID 413, a means for the primary smart card to recognize the delegate (most likely the delegate's public verification key 417), and a time limit 415 during which the substitution certificate 409 (and hence the delegate's authority) is valid. The primary user may identify multiple individuals, any one of whom can authorize the smart card, or a group of individuals of whom multiple ones must jointly authorize the smart card. The antecedents of such methods are discussed in U.S. Pat. Nos. 4,868,877, 5,005,200, and 5,214,702 by Addison Fischer.

As shown in FIG. 25, when a delegate wants to sign a document 403 on behalf of the primary user, the delegate 401 prepares and signs a request 405 in a specified format to be communicated to the primary user's card 407. Attached to, or otherwise included in the message is the substitution certificate 409. If multiple delegates need to authorize the primary user's card, they may sequentially sign the request in a similar manner to the way multiple authorizing agents sign a request submitted to a signing device as discussed above. Upon receipt of the signature request, the primary user's card will verify that the requesting user's signature(s) match(es) the public key(s) that were originally specified in the substitution certificate, apply the primary user's signature 419, and forward the signed document on to a signing device 421 (or other destination) in the usual manner.

The primary user's smart card 407 may be given physically to a delegate. The presence of a time limit for the delegate's authority provide a "time lock" so that delegates can only use the primary user's smart card during a limited period. As discussed above, the primary user's authority is also limited to a fixed time period. These limits reduce the consequences of theft, and allow primary users and delegates to store the primary user's card in a relatively non-secure office environment. After the time period had expired, the smart card would not be vulnerable to any key-guessing attacks. (In fact, it would be immune from attack even if the primary user or delegate had written his/her pin directly onto the card.)

Additional protection against loss or physical attack can be achieved by placing the smart card into a vault or other locked environment, and inserting the card into a card reader where it can be accessed electronically but not physically. In this manner, all the actions described above may be carried out, but no one will have physical possession of the card.

For example, a primary user might be a vice-president in charge of purchasing, who wishes to delegate his specific signature authority to his secretary while he travels to negotiate a pending deal. The substitution certificate might specify that his smart card is to issue the vice president's signature only upon receipt of a signature request signed by: (a) the secretary, as designated by his substitution certificate;

and (b) co-signed by any other person with primary signing authority in the purchasing department. The vice-president places his card in a card reader in a locked vault and leaves.

To obtain the vice-president's signature, the secretary would prepare the document to be signed and compute its associated hash using her desk-top computer terminal. She would then sign the hash, attach the vice-president's public key certificate, the final recipient will need it and then send them in a message to another purchasing agent. The other purchasing agent co-signs the same hash and attaches his public key certificate, along with his authorization certificate which grants him his purchasing authority. The other purchasing agent sends them in a message to the vice-president's smart card through a local area network. Given that the vice-president's card also contains trusted copies of the public keys of the certifying authorities which created these certificates, such as the SWA, the vice-president's card determines that the signatures and certificates are all valid and affixes the vice-president's signature to the document. The card might also request that all these certificates be accompanied by recently signed CRL's or certificates of good standing from a locally recognized CRL handler.

This delegation mechanism takes advantage of an ability to re-program the primary user's smart card. The primary user's smart card is trusted device having known security characteristics, one of which must be a capability to engage in a secure download of new instructions (e.g., substitution certificates), as described for example in co-pending U.S. patent applications Ser. Nos. 08/181,859 and 08/272,203 (Sudia key escrow parent and Sudia key escrow CIP).

The foregoing delegation mechanism may be generalized such that many high-value end-user digital signature keys are in fact generated and used within tamper resistant secure modules (TRSMs) that are stored inside secure vaults or data centers, while the authorization for such signatures comes from signature request messages signed by approved users who are given unofficial (time locked) smart cards to carry around with them. These TRSMs would remain secure against tampering, to prevent any data center personnel from ever having access to user private keys, but could be designed to contain the keys of many different users, each of which might be authorized to act based on some single non-official signature, or some prearranged combination of signatures and authorizations.

Another use for the delegation mechanism, apart from simple delegation from users on temporary leaves of absence, would be a system or method whereby such a programmatic signature request would be made to a card (or to a key contained with a common TRSM) to perform the signature of a major "desk" or other role within a financial or corporate environment.

After learning of the embodiments described above, people practicing in this art will be able to make variations that fall within the spirit and scope of the invention. The embodiments described above are exemplary but not intended to limit unduly the scope of the invention as defined by the following claims.

What is claimed is:

1. A digital signing method comprising steps of:
generating shares of a private signature key;
storing shares in separate electronic signing devices;
certifying multiple authorizing agents for signing devices; and
for each of a plurality of signing devices, affixing a partial signature to an electronic message in response to authorization from a minimum number of authorizing agents;
wherein a plurality of partial signatures constitutes a digital signature.

2. A system for affixing digital signatures to electronic documents comprising:
a plurality of intercommunicative signing devices, each signing device comprising an electronic device programmed to receive an electronic document and to affix a partial signature using a signature key share in response to a predetermined number of authorizations; and
a plurality of authorizing agents, each agent communicative with an associated signing device, each agent comprising an electronic device programmed to provide an authorization to an associated signing device.

3. A system of interlocked rings of signing devices for affixing digital signatures to electronic documents comprising:
a first set of signing devices, said first set comprising a plurality of electronic devices, each device programmed to receive an electronic document and affix a partial signature for a first signature key, a plurality of said partial signatures comprising a first digital signature;
a second set of signing devices, said second set comprising a plurality of electronic devices, each device programmed to receive an electronic document and affix a partial signature for a second signature key, a plurality of said partial signatures comprising a second digital signature;
wherein said first set of signing devices includes at least one member which is not in said second set, and said first and second sets include at least one common member.

4. The method of claim 1, wherein said plurality of signing devices affix the plurality of partial signatures to the message in accordance with a method comprising the steps of:
transmitting said message to a first of said plurality of signing devices said first signing device thereafter affixing a first partial signature to said message; and
transmitting said message having said first partial signature to a second of said plurality of signing devices said second signing device thereafter affixing a second partial signature to said message.

5. The method of claim 4, wherein said transmitting step is repeated for each of said plurality of signing devices.

6. The method of claim 5, wherein said plurality of signing devices is a quorum of the signing devices that have stored shares of the private signature key.

7. The method of claim 6, wherein the quorum of signing devices necessary to form said digital signature may be modified while maintaining the same private signature key by redistributing shares of the private signature key in accordance with a method comprising the steps of:
recombining the shares from each of said signing devices to form the private signature key;
generating new shares of the private signature key such that the quorum of shares necessary to form a digital signature is modified as desired; and
storing the new shares in separate electronic signing devices.

8. The method of claim 7, wherein the quorum is modified by increasing the number of partial signatures necessary to form a digital signature.

9. The method of claim 8, wherein the quorum is modified by increasing the number of signing devices.

10. The method of claim 1, wherein a plurality of authorizing agents are assigned to at least one of said electronic signing devices; and wherein authorization from a quorum of said plurality of authorizing agents is required for said electronic device to affix said partial signature.

11. The method of claim 1, wherein said plurality of signing devices affix the plurality of partial signatures to the message in accordance with a method comprising the steps of:

transmitting said message separately to each of said plurality of signing devices and affixing a partial signature to said message at each of said plurality of signing devices to form a plurality of messages having partial signatures; and combining said plurality of messages having partial signatures to form said message having said digital signature.

12. The method of claim 11, wherein said plurality of signing devices is a quorum of said signing devices that have stored shares of the private signature key.

13. The system of claim 2, wherein said plurality of intercommunicative signing devices affix the plurality of partial signatures to the message in accordance with a method comprising the steps of:

transmitting said message to a first of said plurality of signing devices and affixing a first partial signature to said message; and transmitting said message having said first partial signature to a second of said plurality of signing devices and affixing a second partial signature to said message.

14. The system of claim 13, wherein said transmitting step is repeated for each of said plurality of signing devices.

15. The method of claim 14, wherein said plurality of signing devices is a quorum of said signing devices that have stored shares of the private signature key.

16. The system of claim 2, wherein said plurality of signing devices affix the plurality of partial signatures to the message in accordance with a method comprising the steps of:

transmitting said message separately to each of said plurality of signing devices and affixing a partial signature to said message at each of said plurality of signing devices to form a plurality of messages having partial signatures; and combining said plurality of messages having partial signatures to form said message having said digital signature.

17. The system of claim 16, wherein said plurality of signing devices is a quorum of said signing devices that have stored shares of the private signature key.

\* \* \* \* \*